United States Patent
Bhatia et al.

US006829239B1

(10) Patent No.: US 6,829,239 B1
(45) Date of Patent: *Dec. 7, 2004

(54) APPARATUS AND METHODS FOR DETERMINING THE CORRECT WORKSTATION WITHIN A LAN FOR A LAN MODEM TO ROUTE A PACKET

(75) Inventors: Rajiv Bhatia, Marlboro, NJ (US); Daniel M Brennan, Hillsdale, NJ (US); C. Paul Douglas, Matawan, NJ (US); Jyh-Ming J. Wang, Edison, NJ (US); Suiling C. Zhang, Stony Brook, NY (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/434,898

(22) Filed: May 9, 2003

Related U.S. Application Data

(63) Continuation of application No. 09/295,155, filed on Apr. 20, 1999, now Pat. No. 6,563,824.

(51) Int. Cl.[7] .............................................. H04L 12/64
(52) U.S. Cl. .................................... 370/392; 370/352
(58) Field of Search ................................ 370/351, 352, 370/353, 354, 355, 356, 389, 392, 400, 401, 466, 473, 475; 709/238; 711/202, 205

(56) References Cited

U.S. PATENT DOCUMENTS 5,081,621 A * 1/1992 Sugimoto ................... 370/401

| 5,793,763 | A |   | 8/1998  | Mayes et al. ............... 370/389 |
| 6,128,298 | A |   | 10/2000 | Wootton et al. ............ 370/392 |
| 6,128,664 | A | * | 10/2000 | Yanagidate et al. ......... 709/228 |
| 6,130,892 | A |   | 10/2000 | Short et al. ................. 370/401 |
| 6,243,379 | B1|   | 6/2001  | Veerina et al. .............. 370/389 |
| 6,353,614 | B1|   | 3/2002  | Borcella et al. ............ 370/389 |
| 6,381,646 | B2|   | 4/2002  | Zhang et al. ............... 709/227 |
| 6,453,357 | B1| * | 9/2002  | Crow et al. ................. 709/236 |
| 6,535,511 | B1| * | 3/2003  | Rao ........................... 370/392 |

* cited by examiner

*Primary Examiner*—Andy Lee
*Assistant Examiner*—Duc Duong
(74) *Attorney, Agent, or Firm*—Michaelson & Associates; Peter L. Michaelson

(57) ABSTRACT

A LAN modem permits unambiguous routing for multiple workstations located on a LAN to each gain access through the LAN modem to any one of a number of different remote servers located on a number of different remote networks using a combination of public port number and public address of the workstation. There are instances where sessions are changed between the same workstation/server. This changing of sessions changes the public port numbers associated with each session, which destroys the above unambiguous routing, since the combination of a public destination IP address and a private destination port number is no longer the same unique value contained in an address translation table of the LAN modem. A four step hierarchical procedure is provided in which the LAN modem determines which workstation the packet is to be routed based upon value of fields stored in the network address translation (NAT) table or value of fields stored in a static table. The NAT table or static table entries are compared to the values of fields stored in the packet header.

9 Claims, 11 Drawing Sheets

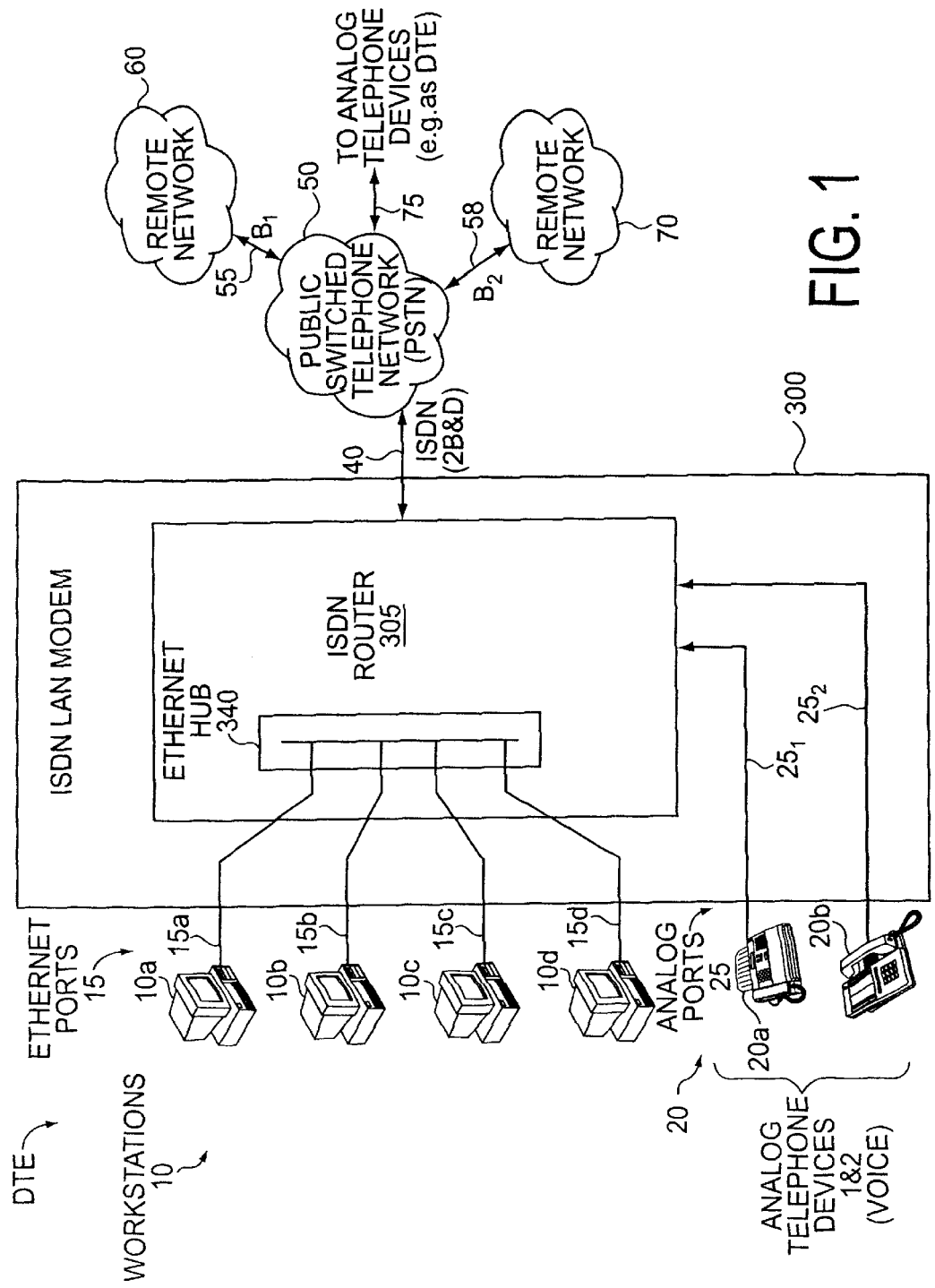

TRUE ROUTING MODE

TWO SIMULTANEOUS REMOTE CONNECTIONS TO DIFFERENT DESTINATIONS

SIMULTANEOUS CONNECTIONS THROUGH SHARED ACCOUNT

APPARATUS AND METHODS FOR DETERMINING THE CORRECT WORKSTATION WITHIN A LAN FOR A LAN MODEM TO ROUTE A PACKET

RELATED APPLICATION

This application is a continuation of United States patent application entitled "Apparatus and Methods for Determining the Correct workstation Within a LAN for a LAN Modem to Route a Packet" filed Apr. 20, 1999 now U.S. Pat. No. 6,563,824 and assigned Ser. No. 09/295,155, which is incorporated by reference herein.

BACKGROUND OF THE DISCLOSURE

1. Field of the Invention

The invention relates to apparatus, and accompanying methods for use therein, for a LAN modem (or an aspect thereof) that contains an internal rouser having a self-contained network hub for connecting multiple network devices, such as workstations, to each other through a local area network (LAN) and for permitting each of those devices to gain access through the router to any one of a number of different remote networks. The invention is also directed to ensuring packet transmission between the workstations and the remote networks.

2. Description of the Prior Art

Workstations networked together have become ubiquitous in recent years. Networks comprising local area networks (LANs) and wide area networks (WANs) have provided computer users, especially businesses, with the ability to transfer a vast amount of data between different workstations and their associated end users. Use of the Internet has recently proliferated, as well as the reliance of the end users on these networked systems. LAN modems provide a connection between the WAN and the LAN permitting routing therebetween.

One difficulty in networking between LANs and other associated networks (or the Internet) is addressing. Over the Internet, public addresses are used to route packets. As networks proliferate, the fixed number of public addresses must be shared by more end users.

One solution to this problem is to have multiple workstations share the same address. This works well where the end users of the multiple workstations know the other's schedule, and can adjust their own schedule accordingly. In cases where the end users do not know each others' schedule, each end user is assuming that the amount of time that each end user is actually on the Internet is relatively small, so the potentially conflicting workstations probably will not be using the workstations at the same time. This solution is far from satisfactory.

Another solution to such network address congestion is to connect multiple workstations to a single LAN, and have all of the multiple workstations share one public address of the LAN. Only the private address for each workstation within a particular LAN differ from each other. Private source IP addresses in a packet header provide meaningful routing information only within that LAN. Only public addresses provide meaningful routing information when the packet is transferred outside of the local network.

Network address translation tables (NAT Tables) are stored in LAN modems to translate packet header information between private address information and corresponding public address information as the packet travels between a LAN and a WAN (such as the Internet). When a packet is transferring from the LAN to the WAN (the packet is located within the LAN modem), the appropriate private values contained in the packet header are replaced by the corresponding public values.

A difficulty with LANs relates to addressing between the LAN and the remote networks during session changes. When a session changes between a workstation on a LAN and a server on a remote network, often the port number changes. This session can change even in the middle of running a single application. There are differences between public address values used in the remote network and the private address values used in the LAN. When the sessions change, port number changes can lead to uncertainties in the LAN modem since the packet routing relies upon original values stored in the network address translation table. It would be desirable to provide a device that can route packets to the correct workstations in LANs even when the port numbers have been changed.

SUMMARY OF THE INVENTION

There are instances where sessions are changed between the same client/server even when running the same application. This changing of sessions changes the port numbers associated with each session. If a port number is being used in the IP address and port number translation by the LAN modem to ensure a unique workstation public identity, then merely chancing the port number would defeat desired unambiguous routing.

The LAN modem of the present invention provides a hierarchical procedure, preferably having four steps, through which the new port numbers of packet headers created by a new session can relate to a stored network address translation table entry. This provides a technique for the LAN modem to route packets to a known workstation located on the LAN.

The first step in the hierarchical procedure involves a packet being routed to the workstation based upon the packet header sufficiently matching the information stored in the network address translation (NAT) table to route the packet. If this step is successful, then the packet is routed to the workstation based upon the routing information stored in she NAT table.

The second step involves a static table that by default has no entries. Each entry is created when a user installs new software, and the user inputs all the applicable routing information into the static table. The static table stores similar information as the network address translation table. If this step is successful, then the packet is routed to the workstation based upon the routing information contained in the static table.

The third step in the hierarchical procedure involves searching the NAT table entries more briefly than done in step 1. This step involves the LAN modem searching the network address translation table for entries relating to prior return packets (packets being transmitted from the remote network to the LAN modem) that originated at the same remote server. Even when destination port number for the return packet changes as the sessions change, the LAN modem assumes that the return packet is destined for the same workstation as the prior return packet. This assumption is reliable since the probability of unrelated packets being transmitted from the same remote server to the same workstation is so small.

The fourth step of the hierarchical procedure involves transmitting all of the packets to a designated workstation. The designated workstation should be selected as the most active workstation on the LAN, or the workstation on the LAN having the most applications.

BRIEF DESCRIPTION OF THE DRAWINGS

The teachings of the present invention can be readily understood by considering the following detailed description in conjunction with the accompanying drawings, in which:

FIG. 1 depicts an overall high-level block diagram of inventive LAN modem 300 in its typical environment of use;

To facilitate understanding, identical reference numerals have been used, where possible, to designate identical elements that are common to various figures.

DETAILED DESCRIPTION

Figure 2A:
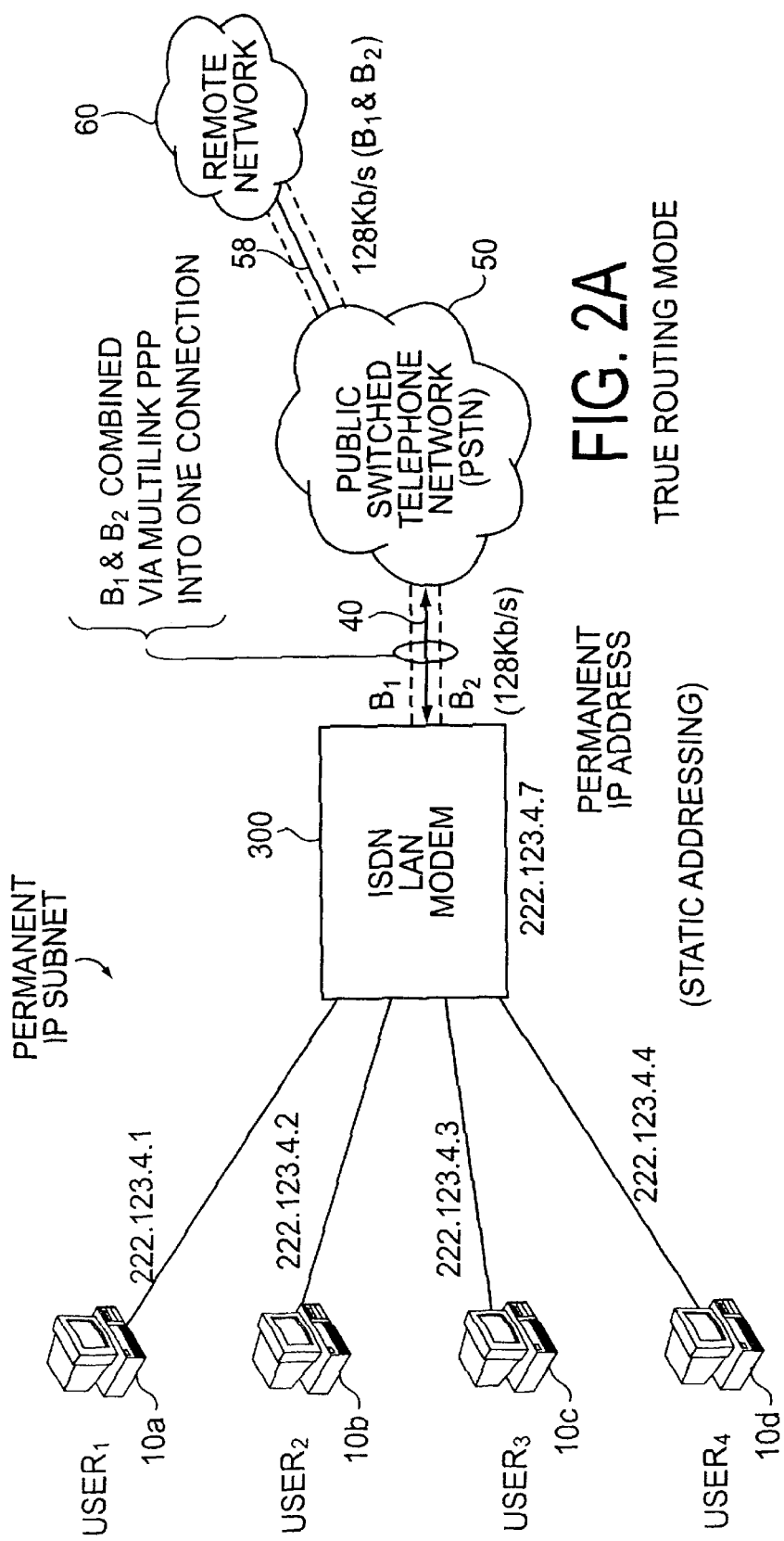
FIGS. 2A–2C each depicts a different illustrative mode of operation which inventive LAN modem 300, shown in FIG. 1, can provide.

After considering the following description, those skilled in the art will clearly realize that the teachings of the present invention can be readily used by any network topology, such as Ethernet, Token Ring, asynchronous transfer mode (ATM), frame relay or other type of network. In addition, these teachings are also applicable across a wide variety of remote network connection modalities, e.g., analog telephone connections using conventional modems, through high-speed digital connections such as ATM or frame relay. Inasmuch as Ethernet networks are the predominant network architecture used in inter-connecting personal computers (PCs) in a local area network, and particularly those for implementing as workgroups, the invention will be discussed in that context.

A. Overall Network Environment

FIG. 1 depicts an overall high-level block diagram of the inventive local area network (LAN) modem 300 in its typical environment of use. LAN modem 300 may include a traditional analog modulator-demodulator as occurs in a conventional analog modem. Alternatively, the LAN modem may include a digitally based device as described and illustrated below.

LAN modem 300 inter-connects a group of workstations 10, illustratively here four individual workstations (typically personal computers—PCs) $10_a$, $10_b$, $10_c$ and $10_d$, in an Ethernet local area network. LAN modem 300 contains router 305 which itself contains an internal Ethernet hub 340 which connects through ports 15, specifically $15_a$, $15_b$, $15_c$ and $15_d$, to workstations 10.

The router establishes a connection through BRI ISDN connection 40 and public switched telephone network (PSTN) 50 to appropriate remote networks 60 and/or 70 (such as the Internet or a private network, accessible through a corresponding service provider, or a remote LAN, such as an office network). Router 305 can accommodate in one of its operational modalities two simultaneous connections over different B channels $B_1$ and $B_2$ in a common BRI ISDN connection, to two different external networks (as discussed below in conjunction with FIG. 2B). These connections are symbolized by leads 55 and 58 connecting remote networks 60 and 70 over channels $B_1$ and $B_2$, respectively.

LAN modem 300, specifically router 305, can route packet traffic between any of workstations 10 and a remote network(s) via PSTN 50. The LAN modem can also accommodate two analog-telephone devices 20 (here illustratively shown as facsimile machine $20_a$ and telephone $20_b$, also denoted as analog telephone devices 1 and 2, respectively) appropriately interfaced, via ports 25, to analog lines $25_1$ and $25_2$. LAN modem can bi-directionally route digitized voice traffic on either B-channel of ISDN connection 40 between PSTN 50, and specifically, either one or simultaneously to both of analog telephone devices 20.

B. Modalities of use of inventive LAN modem

Figure 2B:
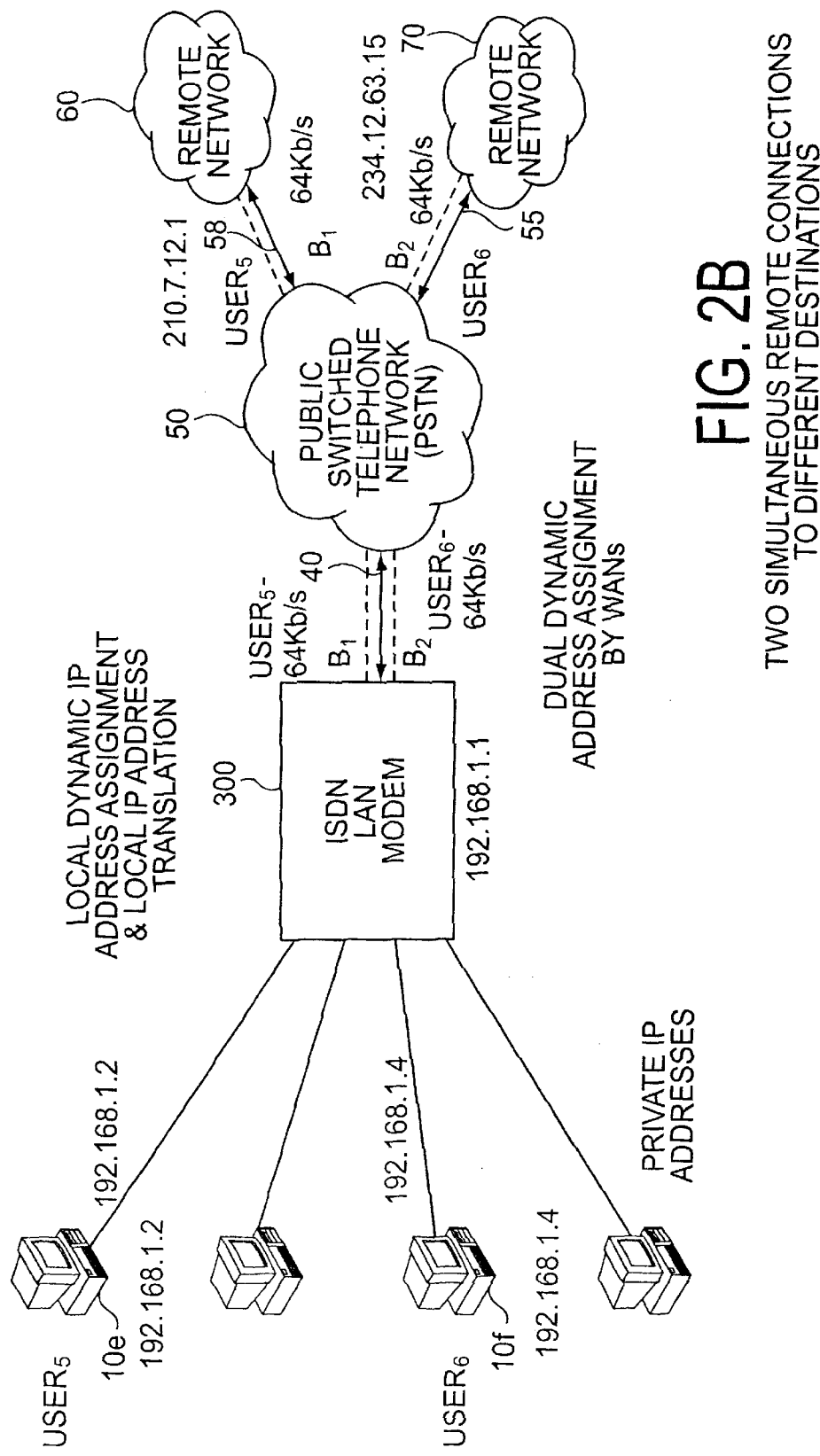
Figure 2C:
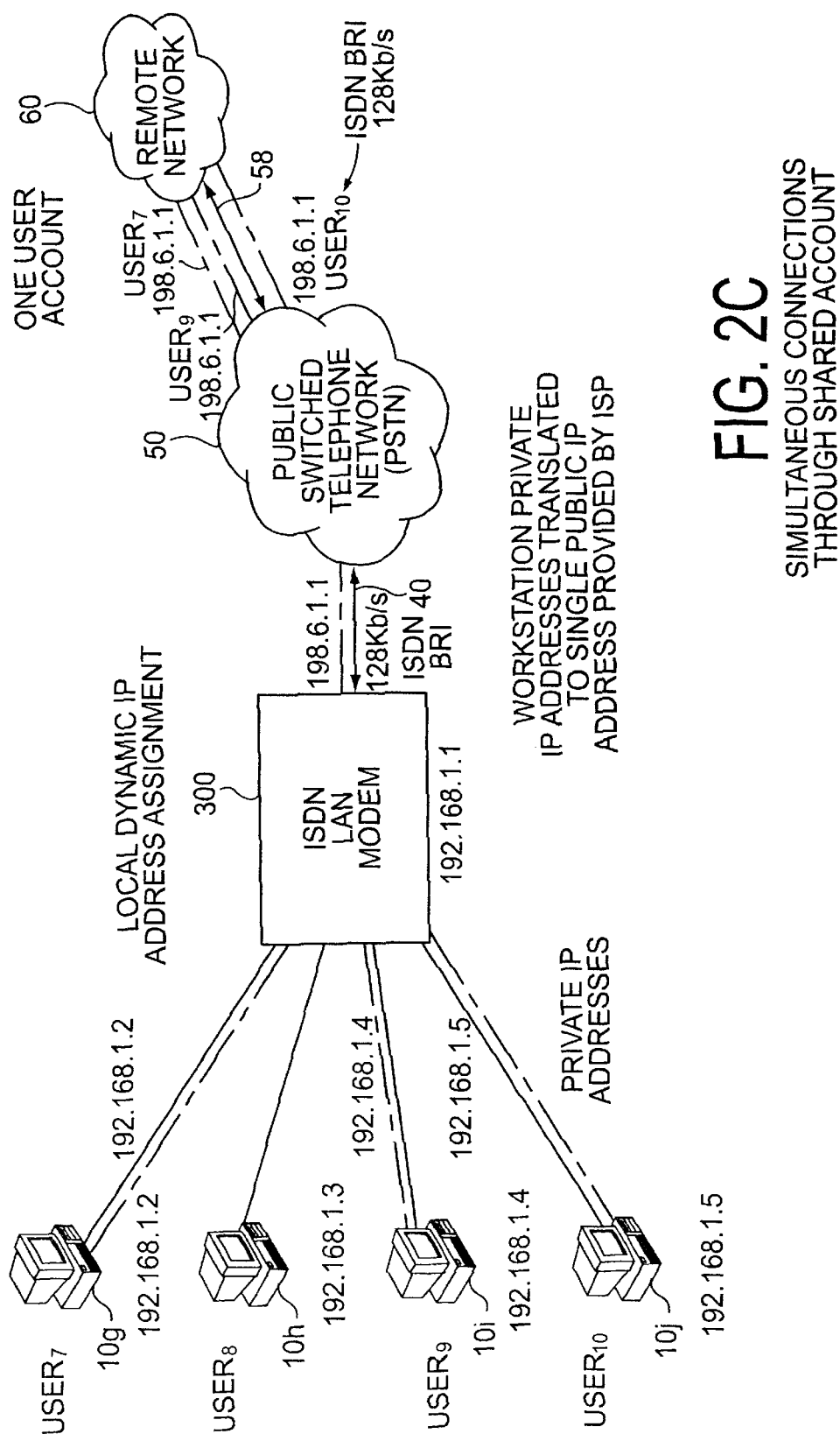

Inventive LAN modem 300 can function in different network modalities shown in FIGS. 2A–2C. For example, LAN modem 300 can: operate as a true router using either dynamic or static IP (internet protocol) addressing for all the workstations on the LAN; provide the two simultaneous connections discussed above, connecting two different workstations in the LAN to different corresponding remote networks over separate B-channels; or provide simultaneous access for any or all workstations in the LAN to a common service provider, such as an internet service provider (ISP), through a single user account.

FIG. 2A depicts LAN modem 300 operating as a true router, using illustratively static IP addressing. Here, workstations $10_a$, $10_b$, $10_c$, and $10_d$ have all been assigned static IP addresses, illustratively 222.123.4.1, 222.123.4.2, 222.123.4.3 and 222.123.4.4, respectively, with LAN modem 300 carrying static IP address 222.123.4.7. Given these addresses, all the workstations and the LAN modem are on the same statically assigned subnet. Consequently, LAN modem 300 will examine packets on the LAN that carry an Ethernet address of the LAN modem and emanating from any of the workstations to determine, from the destination IP address of the packet, whether that packet is destined for a local application, (as discussed below) executing on the LAN modem, or is to be routed off the LAN to a remote network. If the destination IP address indicates a different network (here illustratively remote network 60) then the LAN modem establishes a connection through PSTN 50 to a service provider for illustratively remote network 60. The packet is then routed accordingly to that network. LAN modem 300 also examines all packets incoming from remote network 60 and routes all such packets destined for any of the workstations on the static subnet to the LAN.

In establishing the ISDN connection, the LAN modem can be configured to utilize multi-link PPP (point-to-point) protocol in establishing the connection. Assuming the protocol is supported by the service provider, then, one or both B channels will be used to carry traffic via ISDN lines 40 and 58. The traffic is routed between LAN modem 300, PSTN 50 and the service provider (not specifically shown) to remote network 60. LAN modem 300 can also be configured to dynamically assign an available IP address within the subnet assigned to the LAN modem to each of the workstations as a corresponding user, i.e., $User_1$, $User_2$, $User_3$ or $User_4$, logs onto the LAN network.

Alternatively, as depicted in FIG. 2B, LAN modem 300 can provide two simultaneous connections for two different workstations in the LAN communicating, over separate B-channels to different corresponding remote networks. Here, assume that within a workgroup, $User_5$ and $User_6$ stationed at respective workstations $10_e$ and $10_f$ have different user accounts at different ISPs (Internet service providers), here symbolized by remote networks 60 and 70, respectively, and desire to access the Internet during the same time through these different ISPs. Illustratively, for $User_5$ and $User_6$, LAN modem 300 will establish a single B-channel connection, as symbolized by line 58, over B-channel B, to remote network 60, and as symbolized by line 55, over B-channel $B_2$ to remote network 70, respectively.

Furthermore, in this scenario, as each user logs onto the LAN through a corresponding workstation $10_e$ or $10_f$, LAN modem 300 dynamically assigns an available private IP address to the workstation for that user. Accordingly, workstations $10_e$ and $10_f$ are assigned private IP addresses 192.168.1.2 and 192.168.1.4, respectively; with LAN modem 300 having private IP address 192.168.1.1. The LAN modem maintains a list of private IP addresses available for local use by workstations (or other networked devices) connected to the LAN. None of these private addresses is ever routed beyond the LAN. As the user logs onto the LAN and establishes a connection through LAN modem 300 to his(her) ISP, that ISP will dynamically assign an IP address to that user. The dynamic public IP addresses assigned to $User_5$ and $User_6$ are, e.g., 210.7.12.1 and 234.12.63.15, respectively. Each of the dynamic IP addresses will be stored within the LAN modem (particularly within a shared database therein as discussed below in detail). As incoming packets containing the dynamic IP addresses are routed by the ISPs, over the different B channels, to LAN modem 300, the LAN modem translates the dynamic public IP address contained in each such packet to the private IP address of the corresponding workstation and route the packet (but containing the translated address as the destination IP address, to the LAN).

Similarly, for packets appearing on the LAN which are to be routed by the LAN modem to either of the ISPs based upon the packets destination IP address, the LAN modem translates the source IP address in each of these packets from the private IP address into the appropriate public dynamic IP address of the associated workstation. The translated public IP address is substituted for the private IP address in each such packet, and the packet is routed accordingly to the proper remote network. Though this scenario has been described as using dynamic IP addressing for both of the workstations (i.e., with addresses being dynamically assigned by both the remote networks involved and the LAN modem), both of the workstations can alternatively be statically addressed using fixed public IP addresses. Moreover, though this example depicts merely one workstation connected to each ISP, the LAN modem, as will be clear in conjunction with the scenario depicted in FIG. 2C, can share a common connection to an ISP across multiple workstations.

In addition, as noted above and depicted in FIG. 2C, LAN modem 300 can provide simultaneous access for any or all workstations in the LAN to a common service provider through a single account. Here, assume that within a workgroup, illustrative $User_7$, $User_9$ and $User_{10}$ respectively stationed at workstations $10_g$, $10_i$ and $10_j$ all desire to access, e.g., the Internet through a single user account at a common ISP, here symbolized by remote network 60.

As each of the three users logs on to the LAN through their corresponding workstation, LAN modem 300 dynamically assigns an available private IP address to the corresponding workstation for that user. Accordingly, workstations $10_g$, $10_i$ and $10_j$ are assigned illustrative private IP addresses 192.168.1.2, 192.168.1.4 and 192.168.1.5; with LAN modem 300 itself having private IP address 192.168.1.1. While the first of these three users initiates a connection to remote network 60, via the common ISP, the ISP dynamically assigns an IP address, illustratively 198.6.1.1, to that workstation. In many embodiments of the present invention, both port number fields and IP addresses will be translated. Such IP address and port number translation assure proper uniqueness between a set of source/destination IP addresses, protocol IDs and source/destination port numbers in packets flowing between unique client/server applications and passing through the LAN modem. This provides unambiguous routing in the LAN modem between all the workstations connected to the LAN modem and associated remote servers.

Specifically, for incoming packets traversing from remote network 60 to workstation $10_g$, LAN modem 300 will translate the dynamic public destination IP address in each such packet into the corresponding private destination IP address. The private destination IP address is then substituted for the public destination IP address in each such packet. Each packet having the private destination IP address is then routed to the LAN. Workstation $10_g$ will receive that packet. For outgoing packets from this workstation appearing on the LAN and destined for remote network 60, the LAN modem will translate the private source IP address contained in the packet header, to the corresponding public source IP address. The latter is substituted for the former in the packet, and then the packet is routed via ISDN connection 40 to remote network 60.

The other two users each establish a separate and similar connection through their workstations $10_i$ and $10_j$, via the LAN modem, to the same ISP. LAN modem 300 recognize the same network address of the ISP in packets emanating from these two workstations and translate their differing private IP addresses to the same public IP address associated with workstation $10_g$. Through our inventive addressing technique, all packet traffic for these three workstations will share a single common public IP address (here illustratively 198.6.1.1) and traverse a common ISDN connection.

LAN modem 300 provides suitable IP address translation between the individual private IP addresses of each of the three workstations and the single public address dynamically assigned to first workstation by the ISP. Consequently, as far as the ISP is concerned, all packet traffic involving the three workstations will appear, by virtue of their common, though shared, public IP address, to emanate from or be directed to a single user. As a result of employing this inventive addressing technique as further detailed below, individual packets emanating over a single ISDN connection from the ISP for remote network 60 can be distributed on the LAN to the proper workstation and to a proper application executed thereon. Outgoing packets, from all such workstations, initially having differing private IP addresses can be subsequently routed into a common packet stream over a single shared packet connection to that ISP for subsequent transport over remote network 60.

Figure 3:
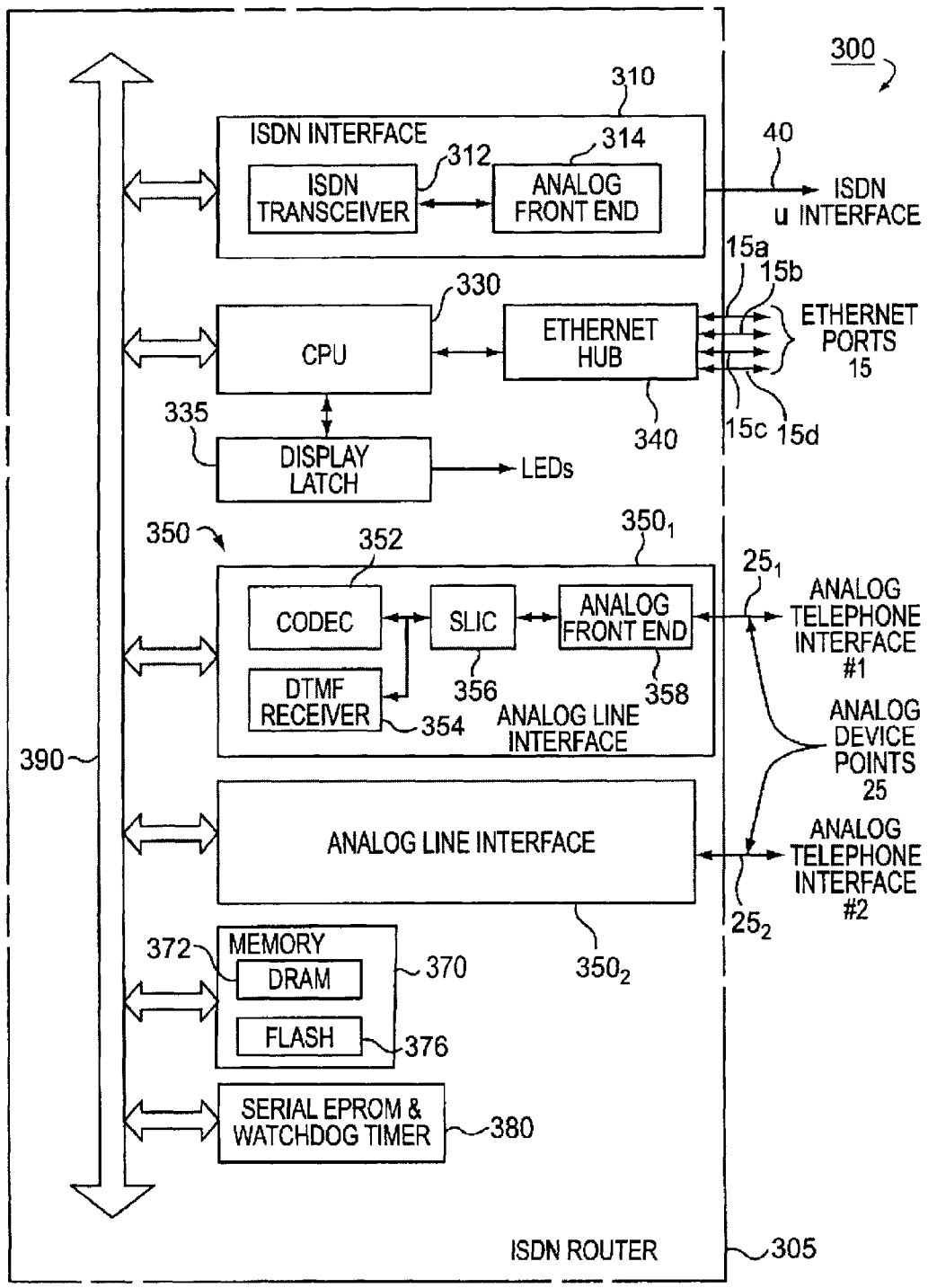
FIG. 3 depicts a hardware block diagram of inventive LAN modem 300 shown in FIG. 1.

The discussion now proceeds to describe the hardware of LAN modem 300 in detail as illustrated in FIG. 3. The software associated with the hardware is then described. To simplify reader understanding, the software is first described with reference to FIGS. 4A and 4B in terms of its overall architecture.

1. Hardware

FIG. 3 depicts a block diagram of inventive LAN modem 300. As shown, the LAN modem contains router 305. Router 305 contains interface 310, central processing unit (CPU) 330; analog line interfaces 350 containing identical analog line interfaces $350_1$ and $350_2$; memory 370; and serial EPROM (electrically programmable read only memory) and watchdog timer 380; all of which are interconnected through bus 390. In addition, the router also contains display latch 335 and Ethernet hub 340. Furthermore, the LAN modem also contains conventional power supply, combinatorial logic and clocking circuits which, for simplicity, have all been intentionally omitted from the figure.

Memory 370, which illustratively comprises dynamic random access memory (DRAM) 372 and flash memory 376, stores software instructions—the salient software processes and modules being discussed in detail below, constants and temporary data all used by the CPU. The flash memory provides non-volatile program and constant storage. Inasmuch as DRAM provides faster access than flash memory, during a power-on boot phase, the boot program is executed to load the executable program code into DRAM, from which the program code is then executed. A portion of the flash memory is also used to store and provide access to so-called "Stac" data compression tables for use in implementing B-channel data compression. Inasmuch as so-called "Stac" compression itself is well-known, we will not discuss the Stac compression algorithm itself in any further detail. Furthermore, the DRAM also stores source- and destination-based routing tables; these tables are discussed in considerable detail below.

CPU 330 is implemented by illustratively a 68EN302 central processing unit (CPU) platform which is currently commercially available, as a single integrated circuit, from Motorola Corporation of Schaumberg, Ill. This platform provides, inter alia, a core 68000-type microprocessor, internal RAM, various timers, a controller and an Ethernet controller (all of which is not explicitly shown). CPU 330 also contains three HDLCs (high-level data link controllers—also not specifically shown), each of which is allocated by the CPU, under program control, to a different one of the 64 Kbits/second B-channels or the 16 Kbits/second D-channel to control data transmission and reception thereover. These HDLCs along with interface 310 collectively implement, in hardware, an ISDN BRI, specifically all ISDN layer 1 functionality.

Interface 310 is conventional and contains ISDN transceiver 312 and analog front end 314, the latter containing a transformer, common mode choke, transient suppressor, ferrite beads, diode bridge and an ISDN DC termination circuit (all of which are not specifically shown). In essence, the termination circuit provides a polarity insensitive dc termination for loop-sealing current and a recognizable signature for mechanized loop testing systems. Interface 310, specifically transceiver 312 therein, bi-directionally passes, i.e., receives and transmits, incoming and outgoing B and D-channel packets between analog front end 314 and, via bus 390, CPU 330. The output of interface 310 is connected, via leads 40, to an ISDN BRI subscriber line. Display latch 335, which is connected to CPU 330, is set by the CPU, under program control, to appropriately energize suitable front panel indicators, specifically light emitting diodes (LEDs), on the LAN modem to indicate its current operational status.

Analog line interfaces 350, which contain identical interfaces $350_1$ and $350_2$, are used to interface LAN modem 300 to analog device ports 25, and particularly to two standard analog telephone devices, via output leads $25_1$ and $25_2$. Each interface (of which interface $350_1$ is typical and will be specifically discussed) interfaces LAN modem 300, particularly router 305 therein, to a corresponding one of two analog telephone devices via leads $25_1$ and $25_2$. In particular, interface $350_1$ contains codec (coder-decoder) 352, dual-tone multi-frequency (DTMF) receiver 354, subscriber loop interface circuit (SLIC) 356 and analog front end 358. Codec 352 converts B-channel digital data appearing on bus 390 and destined for, e.g., an analog telephone device (such as, e.g., a telephone or facsimile machine) connected to leads $25_1$, into a conventional analog telephony form. Analog front end 358 contains a conventional analog hybrid circuit, not specifically shown, which injects appropriate analog tones into tip and ring lines of an analog telephone device port, and provides echo cancellation and battery feed functions. DTMF receiver 354 collects DTMF tones appearing on the analog line, e.g., line $25_1$, connected to the interface and applies the tones to SLIC 356. The SLIC provides conventional analog telephony (POTS—plain old telephone service) functions of: DC battery feed, over-voltage, ringing, two-wire supervision, two-to-four wire hybrid, and test functions, as well as current limiting, on-hook transmission, tip-open and loop-current protection.

Each HDLC controller has an associated software-implemented device driver. Under an event-driven software-implemented supervisor, CPU 330, in view of current resource requests and then available hardware resources, assigns and binds a given controller and its associated driver to a particular hardware resource in order to handle a desired ISDN connection (e.g., call send or receive) or, e.g., dynamically switch the functionality of a given B-channel to handle a voice call (or revert back to a data connection) during an on-going ISDN connection.

Within serial EPROM and watchdog timer 380, the Ethernet address of the LAN modem itself, and other fixed configuration information such as a serial number of the LAN modem, is stored within the EPROM and serially read therefrom during initialization of the LAN modem. The watchdog timer is periodically reset, under program control, by the CPU. However, should the timer not be reset in the event of a failure condition, the timer will time-out and generate a suitable pulse to reset and re-initialize the CPU and hence the LAN modem, and thus attempt to return the LAN modem to its proper operation.

Router 305 also contains an Ethernet hub 340 to provide an internal LAN with external Ethernet ports 15. This hub is directly connected to CPU 330 and is controlled by the Ethernet controller internal to the CPU. Hub 340 provides four Ethernet ports 15, specifically Ethernet ports $15_a$, $15_b$, $15_c$ and $15_d$, to which four separate workstations 10 (see FIG. 1) (or other suitable network devices) can be connected.

2. Software

Figure 4A:
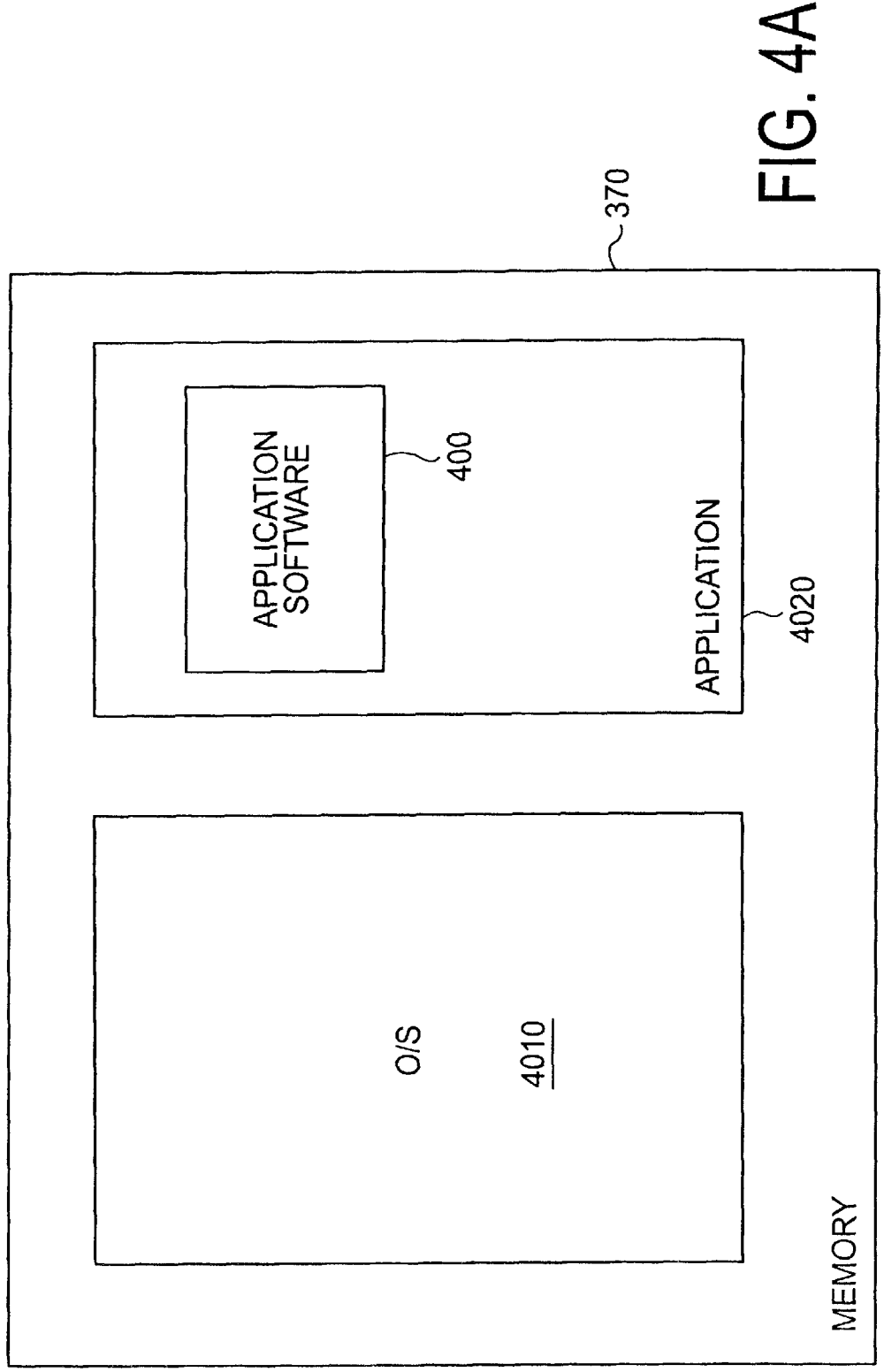
FIG. 4A depicts an overall block diagram of software that is executed by central processing unit (CPU) 330 situated within the inventive LAN modem.

Given the above hardware description of LAN modem 300, we now focus on the software. FIG. 4A depicts a high-level diagram of software executing in the LAN modem.

The software stored in memory 370 contains operating system (O/S) 4010 and application programs 4020. Since operating system details are irrelevant to the present invention, all such details will be omitted from the ensuing discussion. Application programs 4020 are formed of a collection of application processes and modules, which are grouped as application software 400 shown in FIG. 4A.

Figure 4B:
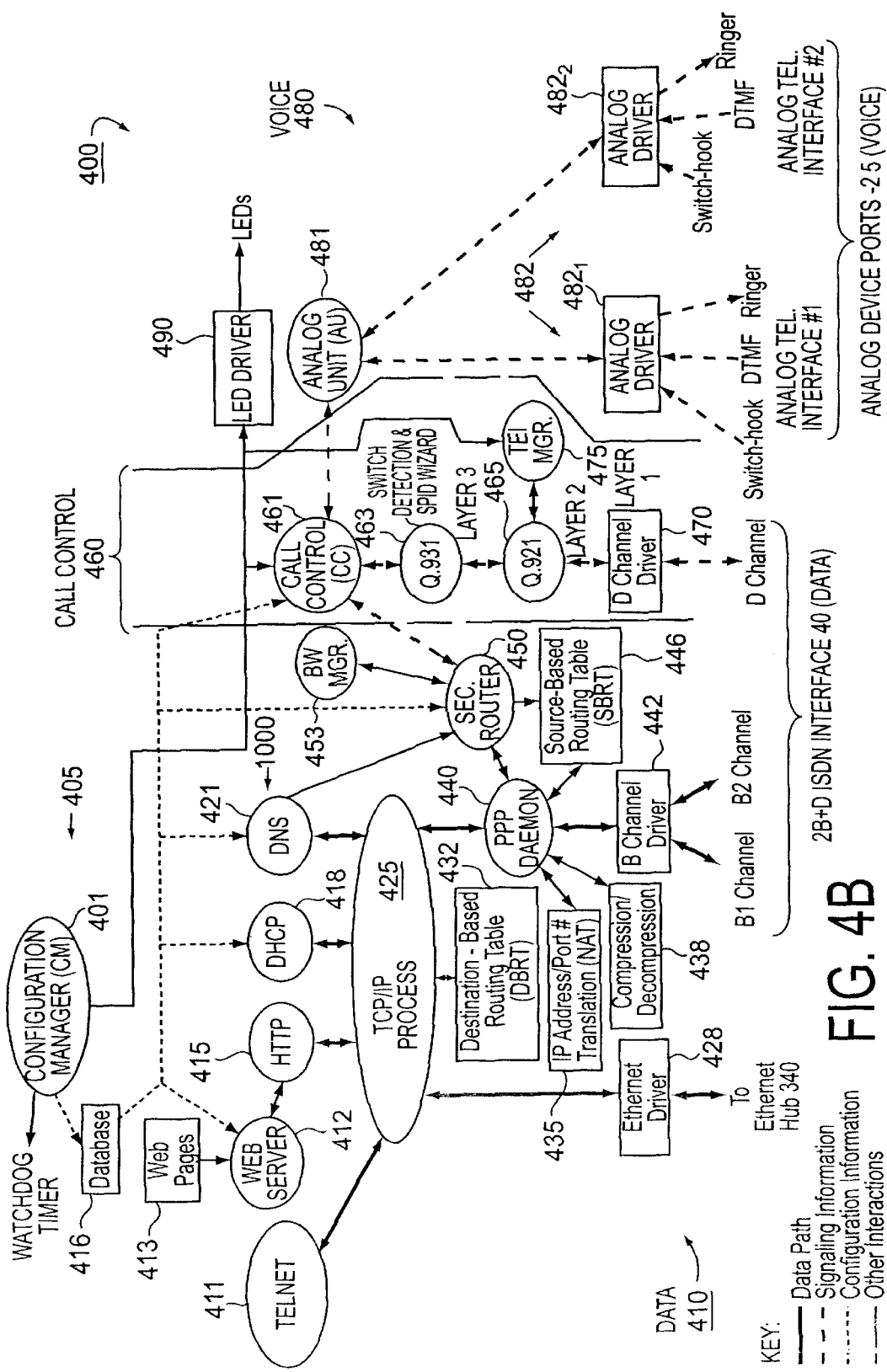
FIG. 4B depicts an architectural block diagram of software 400 contained within application software 4020 shown in FIG. 4A that, among other aspects, implements the various modes of operation of the LAN modem shown in FIGS. 2A–2C.

FIG. 4B depicts an architectural block diagram of software 400 that collectively executes as foreground tasks shown in FIG. 4A. As indicated in a key shown in FIG. 4B, thick solid lines denote data paths; thick and thin dashed lines denote signaling and configuration information paths, respectively; and thin solid lines denote other process interactions.

As shown, overall functionality of software 400 can be divided into four basic sections: configuration section 405, data section 410, call control section 460 and voice section 480. Voice section 480 is directed to analog (commonly referred to as "voice") telephony connections provided through analog telephone device ports 25 (as shown in FIG. 1).

As shown in FIG. 4B, configuration section 405 contains Configuration Manager process 401. Process 401 properly configures, e.g., initializes, and executes various software processes in the LAN modem.

Data section 410 controls transmission and reception of data packets, i.e., B-channel packets, between the LAN, to which workstations 10 (see FIG. 1) are connected, and the appropriate ISDN B-channels to which the LAN modem is then connected.

Call control section 460 interacts with a local ISDN switch at a telephone central office to establish and terminate ISDN calls in order to appropriately route traffic between the LAN, via the switch and PSTN, and a remote network, or to connect a near-end analog telephone device to the LAN modem, via the ISDN switch and PSTN, to a called or calling far-end device.

Voice section 480 establishes and terminates analog telephone voice connections, over an appropriate B-channel(s), involving either one (or both) of analog telephone device ports 25 provided by the LAN modem.

LED Driver 490, though not specifically contained within any of sections 405, 410, 460 and 480, suitably energizes, under program control, LED indicators (see FIG. 3) to indicate current status information, respectively.

In particular, upon power-up of the LAN modem, Configuration Manager 401, shown in FIG. 4B, is the first process to be executed, with it, in turn, spawning all other processes and applications, as needed. In that regard, the Configuration Manager launches, controls and terminates, as needed, the execution of various software processes and applications that collectively establish an ISDN connection, properly handle B-channel data packet traffic during that connection and to terminate the ISDN connection at the conclusion of the call. The database collectively stores, e.g.: a serial number, product name and software version of the LAN modem; an Ethernet (private) address of the LAN modem; an IP (public) address and subnet mask of the LAN modem itself; status information including whether DHCP (dynamic host control protocol) server 418 and DNS (domain name system) server 421, shown in FIG. 4B, in the LAN modem are each currently enabled or not; a range of private IP addresses available for assignment to the workstations that connect to the LAN; an indication as a type of ISDN switch to which the LAN modem is connected and the SPIDs associated with the ISDN directory numbers assigned to the LAN modem; various usage parameter values, such as minimum call connect time and inactivity periods; a profile for each workstation connected to the LAN; and a profile for each different network service provider that can be accessed by one or more of the workstations through the LAN modem.

Database 416 is directly accessed from flash memory 376. This database is queried by various processes, as discussed below, to provide status and configuration information, as needed, for use in properly establishing, maintaining and terminating ISDN connections, and properly routing packet traffic between a remote network and any of the workstations connected to the LAN or any of the two analog telephone devices connected to the LAN modem; or among the workstations themselves.

Data section 410 contains drivers, local applications, processes, stored web page components and page templates, a web server and routing tables.

The processes include TCP/IP process 425, PPP daemon process 440, secondary router (SR) 450 and Bandwidth Manager (BM) 453. Of these processes, TCP/IP process 425 implements a basic routing engine in the LAN modem. In that regard, process 425, lies at the heart of data section 410, conventionally implements the TCP/IP protocol stack and destination-based routing. This process provides all processing for IP, TCP (transmission control protocol), UDP (user datagram protocol) and ARP (address resolution protocol) protocols. This process also provides a standard and conventional "sockets" interface to various local applications situated at the top of the stack, such as Telnet server 411, HTTP (hypertext transfer protocol) daemon 415, DHCP server 418 and DNS server 421; and a common network interface to all drivers situated at the bottom of the stack. In particular, process 425 accepts incoming IP packets from the LAN, as supplied by Ethernet driver 428. In that regard, each of these packets, as conventionally occurs, is encapsulated, as payload data, within an Ethernet packet and is extracted therefrom by Ethernet driver 428. As such, process 425 either routes the IP packet to either one of the local applications or protocols for processing, based on a protocol ID and well-known port number contained within the packet, or, with appropriate IP address and port number translation as needed and discussed below, onward to the appropriate B-channel for carriage over a remote network. Specifically, if the IP address of the packet matches that of the LAN modem, then the local application to which the packet is routed is determined by a protocol ID and port number contained in the packet itself.

PPP daemon process 440 implements the conventional and widely known PPP protocol for a given data connection between a workstation and its remote PPP peer, e.g., a network service provider. Specifically and to the extent relevant, the PPP protocol is comprised of three major components (layers), all of which are advantageous for use in an ISDN networked connection: (a) a link control protocol (LCP) for establishing, configuring, and testing an end-to-end data-link, e.g., ISDN, connection and authentication protocols for authenticating that connection; (b) a multi-link PPP layer for utilizing both B-channels simultaneously; and (c) a network layer which consists of network control protocols (NCPs), a compression control protocol (CCP) for controlling data compression, and Bandwidth Allocation Control Protocol (BACP) for controlling addition and removal of a second multi-link channel. With this in mind, once an ISDN connection has been connected, the PPP daemon negotiates, upon user request, with a remote PPP peer as to whether multi-link PPP is to be used or not over that connection. In particular, once the LCP protocol has been successfully negotiated, daemon process 440 then monitors and authenticates, through suitable authentication protocols (e.g., password authentication protocol and challenge handshake authentication protocol—both of which are not specifically shown), the users on both sides of the connection; and monitors the IP protocols in use on both sides of the connection.

3. NAT Table Operation

The IP/Port Number Translation module provides network address translation (NAT), between private and public IP address pairs, to permit users at multiple workstations to simultaneously share a single user account at a network service provider, such as an ISP. This process ensures that IP packets, based on their transit direction through LAN modem 300, i.e., directed to workstations on the LAN or to the remote network, will contain proper IP addresses to delineate correct sources and destinations to facilitate sharing of a single network, e.g., ISP, account. In this regard, module 435 translates the private source IP addresses of all outgoing packets from the LAN into a single public source IP address, i.e., that associated with the LAN modem itself (and either statically or dynamically assigned to the LAN modem) and provide that address to NAT table 435 to be substituted for the private IP address within each of these outgoing packets. These packets with the substituted public address are then provide by daemon process 440 to B-channel driver 442 for transport, over an appropriate B-channel(s), to the network service provider. Hence, the LAN modem will effectively multiplex all these outgoing packets onto a common network connection.

Similarly, incoming IP packets from the common network service provider, and provided via driver 442, possess a single common public destination IP address. Module 435 translates that single public destination IP address in each of these incoming packets into an appropriate private IP address of the corresponding workstation to which that packet should be destined. For each such incoming packet, module 435 substitutes the private IP address for the public address in that packet and then provides the resulting packet to TCP/IP process 425. Hence, the LAN modem effectively de-multiplexes all these incoming packets to separate network connections on the LAN. This translation also encompasses suitably translating the port number field in the IP packets (specifically the source port number field, if the packet is traveling on the LAN in a direction of the network service provider; or the destination port number field, if the packet is traveling on the LAN in a reverse direction to a workstation). The port number field, in this instance, specifies the particular TCP or UDP application session, such as for Telnet, HTTP, FTP, or some other application, for which the packet is either destined to or from which it is emanating. This translation ensures uniqueness of a set of source/destination IP addresses, protocol ID and source/destination port numbers in packets that flow between unique client/server applications and pass through the LAN modem, and hence provides unambiguous internal packet routing in the LAN modem between all the workstations connected to the LAN modem and associated remote servers connected thereto.

The IP address translation in FIG. 4B is effectuated through the two-level source-based routing. Destination IP addresses for each host are stored within Destination-Based Routing Table (DBRT) 432; while B-channel and service provider information are stored within Source-Based Routing Table (SBRT) 446. Both of these tables are solely maintained in DRAM 372 within memory 370 (see FIG. 3). DBRT 432 is used by TCP/IP process 425, shown in FIG. 4B, to first determine whether an IP packet is destined for a particular workstation (host) on the LAN, one of the local applications executing within the LAN modem, or a remote destination, such as a remote network. Should a packet be destined or incoming from a remote network, hence requiring public-private IP address translation, IP address/port translation (NAT) module 435, in conjunction with addressing information stored with SBRT 446, provides the public-private address translation (including port number translation), when necessary. NAT table 435 contains suitable public and private source and destination IP address information and source and destination port number designations for packets then to be carried over that channel. The two-level source-based addressing system is more fully described in co-pending United States Patent Application entitled "APPARATUS AND METHODS FOR USE THEREIN FOR AN ISDN LAN MODEM THAT SELECTS AMONG A PLURALITY OF DNS SERVERS FOR RESPONSE TO A DNS QUERY", Ser. No. 08/938,370, invented by R. Bhatia et al., filed Sep. 26, 1997; which is incorporated by reference herein.

A description of the algorithm used for Network Address Translation (NAT), in essence, is provided in K. Egevang and P. Francis in "*Informational RFC (Request for Comment)* 1631", *Internet Engineering Task Force (IETF)*, May 1994, which is incorporated by reference herein.

Figure 5:
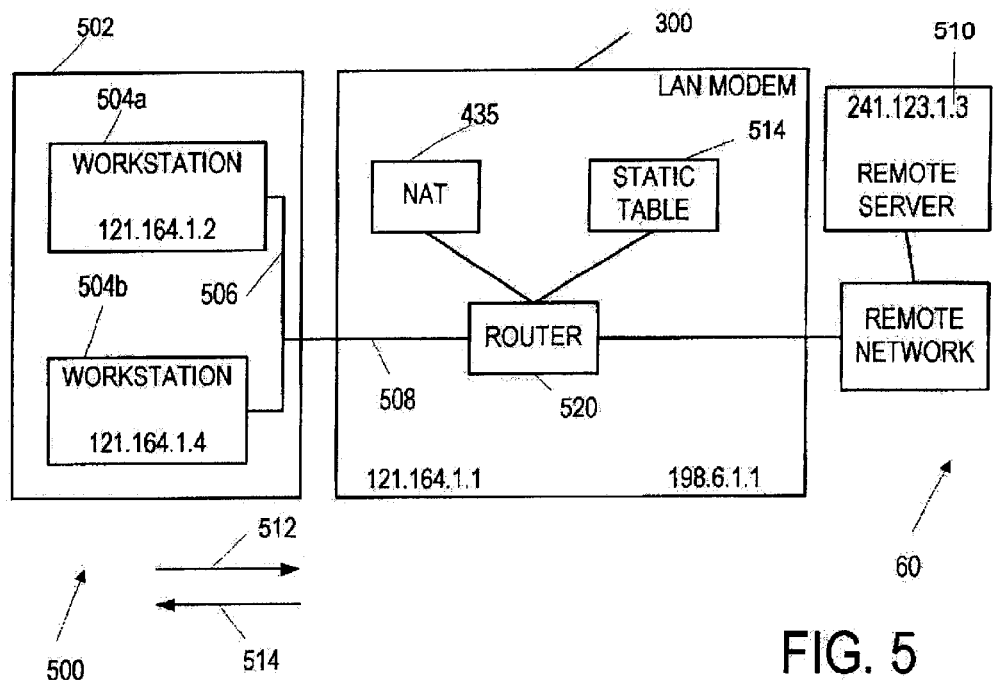
FIG. 5 depicts an overall block diagram of another embodiment of software of the present invention that is executed by central processing unit (CPU) 330 situated within the inventive LAN modem.

To make certain improvements of the present embodiment more apparent, FIG. 5 shows NAT table 435 of FIG. 4B in a simplified network configuration. NAT table 435 of LAN modem 300 stores translation values between public and private addresses (and public and private port numbers) in packets of information transmitted between workstations located in a LAN and remote servers located in remote network 60 (see FIGS. 2A to 2C).

FIG. 5 also shows elements associated with packet transmission and addressing within network 500. This network 500 comprises LAN portion 502, LAN modem 300, remote network 60 such as the Internet, and remote server 510 connected to the remote network.

LAN portion 502 comprises LAN connector 506 and network connector 508. Network connector 508 connects the LAN connector 506 to router 520 of the LAN modem. LAN connector 506 and network connector 508 are formed from any transmission material (such as glass or coaxial cable) providing suitable transmission results. In addition, though LAN connector 506 is illustrated as the topography of LAN network 502 in FIG. 5, any other type of LAN arrangement might be used (such as token ring, etc.). Workstations 504*a* and 504*b* are of the type previously described and shown in FIGS. 2A to 2C.

LAN modem 300 comprises router 520, NAT table 435, and static table 514. Each of these elements is software-based. Static table 514 functions in conjunction with NAT table 435 to store and translate between similar private and public addresses in LAN 502 and remote network 60. Both the static table and the NAT table contain entries comprising public address/private address pairs and public port number/ private port number pairs in DRAM 372 of FIG. 3. Those entries are normally automatically input into the NAT table 435 by the LAN modem and are manually programmed into the static table 514 at workstation 504a or 504b.

Figure 6:
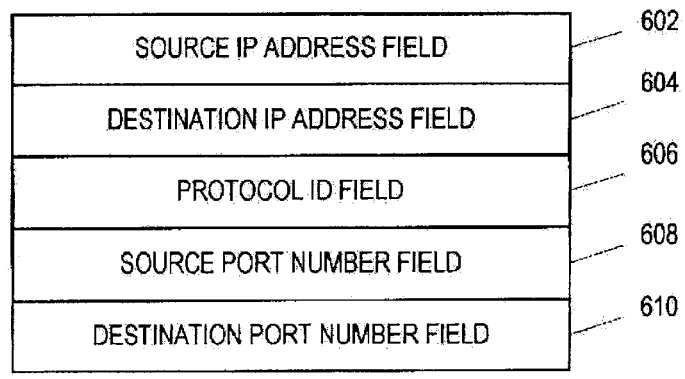
FIG. 6 depicts one embodiment of fields contained in packet header 600 of the present invention.

FIG. 6 illustrates packet header 600 that is used in the routing of each packet of information within network 500 of FIG. 5. Each packet header 600 contains a source IP address field 602, destination IP address field 604, protocol ID field 606, source port number field 608, and destination port number field 610. As each packet is routed from workstation 504a to remote server 510, certain values stored in fields of that packet header 600 will change as illustrated in TABLE 1. Specifically, the text in TABLE 1 describes the data type contained in each field as the packet traverses LAN modem 300. As an example, TABLE 1 contains parenthetical values for source and destination IP addresses and port numbers that may also be selected by workstation 504a while transmitting a single packet of information. For simplicity, TABLE 1 does not illustrate the FIG. 6 Protocol ID Field that identifies a Transport layer protocol on top of IP, such as TCP or UDP.

Case I of TABLE 1 illustrates the values contained in the packet header of one packet of information being transmitted from workstation 504a to LAN modem 300 in a direction given by arrow 512 in FIG. 5. Workstation 504a defines the original (and unique) values of fields 602, 604, 606, 608 and 610 for that particular packet header. The fields include: (a) the destination IP address is the public address of remote server 510 as determined by workstation 504a; (b) the source IP address is the private address of workstation 504a; (c) the source port number is the private port number associated with the present application on that workstation 504a; and (d) destination port number 610 is the remote servers public port number.

TABLE 1

VALUES STORED IN PACKET HEADER FIELDS

| CASE | SOURCE IP ADDRESS 602 | DESTINATION IP ADDRESS 604 | SOURCE PORT NO. 608 | DESTINATION PORT NO. 610 |
|---|---|---|---|---|
| I. PACKET TRAVELLING IN DIRECTION 512, AND LOCATED IN LAN | PRIVATE IP ADDRESS OF WORKSTATION (example: 121.164.1.2 IN FIG. 5) | PUBLIC IP ADDRESS OF REMOTE SERVER (example: 241.123.1.3 IN FIG. 5) | PRIVATE PORT NUMBER OF WORKSTATION APPLICATION (example: 5000) | PUBLIC PORT NUMBER OF REMOTE SERVER APPLICATION (example: 7000) |
| II. PACKET TRAVELLING IN DIRECTION 512, AFTER LEAVING LAN MODEM 300 | PUBLIC IP ADDRESS OF LAN (example: 198.6.1.1 IN FIG. 5) | SAME AS CASE I | PUBLIC PORT NUMBER OF WORKSTATION APPLICATION (example: 5002) | SAME AS CASE I |
| III. PACKET TRAVELLING IN DIRECTION 514, BEFORE REACHING LAN MODEM 300 | PUBLIC IP ADDRESS OF REMOTE SERVER (example: 241.123.1.3 IN FIG. 5) | PUBLIC IP ADDRESS OF LAN (example: 198.6.1.1 IN FIG. 5) | PUBLIC PORT NUMBER OF REMOTE SERVER APPLICATION (example: 7000) | PUBLIC PORT NUMBER OF WORKSTATION APPLICATION (example: 5002) |
| IV. PACKET TRAVELLING IN DIRECTION 514, WHILE LOCATED IN LAN | SAME AS CASE III | PRIVATE IP ADDRESS OF WORKSTATION (example: 121.164.1.2) | SAME AS CASE III | PRIVATE PORT NUMBER OF WORKSTATION APPLICATION (example: 5000) |

A distinct source port number and private source IP address pair is maintained for each information packet associated with each session originating by each workstation. This distinct pair is stored in active NAT table 435 or active static table 514. Storing the distinct pair is necessary because any workstation located in the same LAN contains an identical public address. The LAN modem uses the public port number to distinguish workstations in the same LAN. All packets transmitted from any workstation (e.g. workstation 504a) in the same session are originating from the same location, have the same destination, and are related to the same protocol, and therefor have identical values in each field 602, 604, 606, 608, and 610. This identical value of fields 602, 604, 606, 608, and 610 is true for response packets as well.

Case II of TABLE 1 illustrates fields in packet header 600 after LAN modem has processed the packet (and the packet is routed to the remote server). Destination IP address field 604 and destination port number field 610 remain the same in Case II as in Case I since both cases use public destination values. However, source IP address field 602 and source port number 608 have to be changed from private to public values since the packet in Case II is located outside of the LAN.

A translation may be required in the port number field (Source Port number field, if the packet is going in the LAN to Remote Network direction; Destination Port number field, if the packet is going towards a workstation on the LAN). This translation will be needed to ensure the uniqueness for each workstation in the LAN of the combined set of Source/Destination IP addresses and Source/Destination Port numbers, for packets flowing between unique client/server applications and passing through the LAN modem. Port number translation is effectuated by selecting an available port number from a range and searching existing entries in a NAT table to determine if this selected port number is already in use. If the number is free, that number is then used as a translated port number. Alternatively, if the selected number is in use, a next successive port number is selected, and so on, to locate a free port number for use in translation.

As a numerical example, in FIG. 5 assume that the workstations with IP addresses 121.164.1.2 and 121.164.1.4 wish to communicate with the same server application on the same workstation on the Remote Network (having an IP address 241.123.1.3). Assume that the TCP protocol has to be used (Protocol number=6), and that the server application is Telnet (Port number=23) in both cases. If both workstations, 121.164.1.2 and 121.164.1.4, select the same port number (for example, Port number=5000) on their side to identify their client applications, then this port number must be translated by the LAN modem (for one of the workstations) to be able to unambiguously route packets (since in the remote network, both private address 121.164.1.2 and 121.164.1.4 will be translated to the public address 198.6.1.1). Without port number Translation, packets coming to the LAN modem from the remote network (with Source IP address 241.123.1.3, Protocol number 6, Source Port number 23, Destination IP address 198.6.1.1, and Destination Port number 5000) will be unroutable because LAN modem will not know whether to send a packet to workstation 121.164.1.2 or 121.164.1.4.

Figure 7:
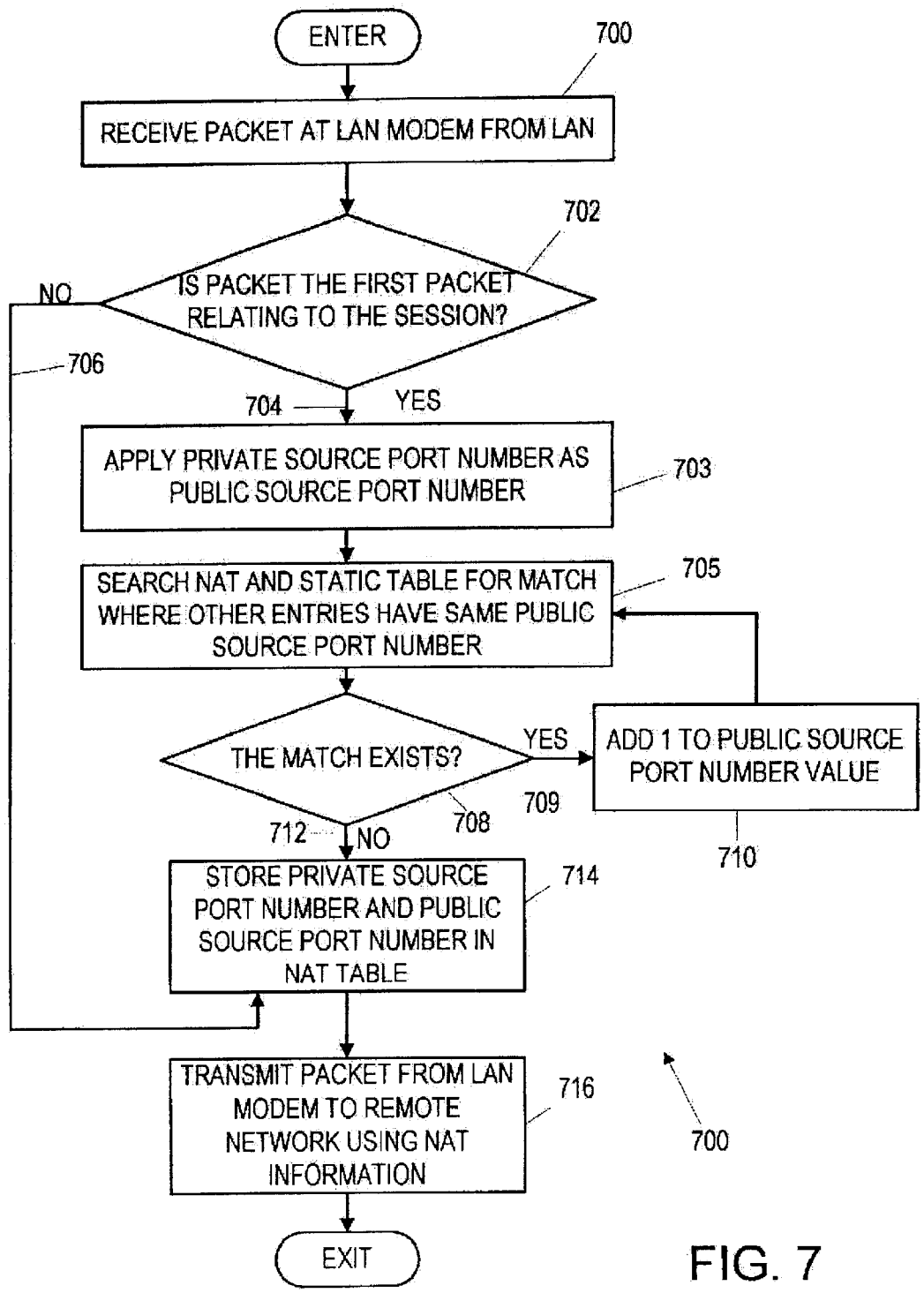
FIG. 7 depicts a block diagram of our invention software that ensures uniqueness of public port numbers, the software being executed by the central processing unit (CPU) 330 situated in LAN modem.

Incrementing procedure 700 shown in FIG. 7 ensures LAN modem 300 assigns a distinct public source port number in the NAT table for each packet transmitted from the same workstation during a given session. Block 701 considers each packet received at the LAN modem that is transmitted from the LAN 502 of FIG. 5. The procedure continues to decision block 702 which determines whether the packet is the first packet relating to a specific session by determining if the NAT table contains identical field values to she packet header. If LAN modem 300 has previously received other packets relating to the same session, then decision block 702 routes execution to block 716 via NO path 706, and routes the packet according the information combined within the NAT table 435. This follows that all packets in a particular session are generated with packet headers having the same addresses and port numbers. If the LAN modem finds that the public source port number is unique to a given workstation, then the LAN modem does not assign the same public source port number to a subsequent workstation when the session involving the first workstation is active (which follows the FIG. 7 logic). The public source port number is unique under these circumstances. If the LAN modem has not previously received other packets relating to the some session, then the decision block 702 routes execution, via YES path 704, to block 703.

Blocks 701, 703, 704, 706, and 710 determine whether another session has used the same value of public source port number as the private source port number contained in the packet header. If not, the value of the private source port number is selected as the public source port number. If so, the considered public source port number is incremented by the LAN modem to another value until a unique value is found. The LAN modem does not change the private source port number since this value is the original value selected by workstation as stored in the NAT table. Additionally, further packets generated by the same workstation relating to the same process will be assigned the same private source port number.

After the public value is selected, any final public source port number selected by LAN modem 300 to provide uniqueness should be transparent to the workstation. Block 703 assigns the original private source port number selected by the workstation to be the starting public source port number. Execution then continues to block 705. In block 705, CPU 330 of FIG. 3 searches NAT table 435 and static table 514 to determine if there are any stored entries where the private source port number matches in the NAT table or the static table. If there are any matches in decision block 708, then execution follows path 709 to block 710 that increments the public source port number by one. Execution then continues to block 704; the procedure repeats itself until a unique source port number is found. Once this unique public source port number is determined, execution proceeds to block 714.

To provide a numerical example of the procedure outlined in FIG. 7, consider the parenthetical values of the source port number values contained in TABLE 1 and FIG. 5. Assume that the workstation selected 5000 as the original private source port number. Also, assume that NAT table 435 and/or static table 514 contains 5000 and 5001 as public source port-numbers for packets using the LAN modem in prior sessions. As soon as the packet is received by the LAN modem, then CPU 330 of FIG. 3 considers the values stored in the NAT table and/or the static table to determine whether 5000 has been previously stored as a public port number. Following the procedure contained in FIG. 7, the processor will determine that 5000 (and then 5001) is already contained in the NAT table and/or the static table. However, when the value of 5002 is compared, then the CPU will determine that no such value of public source port number currently exists. The 5002 value will thereupon be stored as the public source port number by block 714 in the NAT table, as illustrated in Case II.

Block 714 stores the last incremented value of public source port number, along with the source IP address, in NAT table 435. If LAN modem 300 stores a combined public source port number, a public source IP address, a public destination IP address, and a private source IP address for a particular workstation, then the LAN modem will have enough information to be able to uniquely identify which workstation transmitted that particular packet for the session. This is also a necessary consideration when the LAN modem receives a response packet from remote server 510 responding to that original packet.

The packet header (containing 5002 as the public source port number field 608 in FIG. 6) is then transmitted to the remote server 510 as per block 716. Block 716 transmits the packet containing appropriate header information 600 from the LAN modem 300 via remote network 60 to remote server 510. When routed in the remote network 60, the packet header contain information relating to the public source IP address and the public source port number as indicated in Case II of TABLE 1. This is important since the Internet is not capable of routing with private values (the Internet can only use public address and port values).

After remote server 510 has received and processed the packet from workstation 504a, this server transmits return packet to that workstation in direction shown by arrow 514 of FIG. 5. For purpose of this application, we define the term "return packet" as identifying any packet traveling from the remote network 60 to the LAN 502 along a direction indicated by arrow 514 in FIG. 5. Operation of the remote server is well known, and is not particularly related to the LAN modem of the present invention. Field values of the return packet as transmitted by remote server is illustrated by Case III in TABLE 1. The return packet header being transmitted between the remote server and LAN modem 300 must contain public destination IP address and public source IP address fields.

As shown in FIG. 5, all return packet traffic generated towards the LAN modem from the Remote Network side will be directed to IP address 198.6.1.1. The LAN modem will have to demultiplex this traffic and deliver it to the appropriate workstation on the LAN. This will always require a translation from IP address 198.6.1.1 to 121.164.1.2 or 121.164.1.4. This is accomplished as illustrated in TABLE 1 by the remote server reversing the values contained in the source IP address field 602 and destination IP address field 604 in FIG. 6. The corresponding source and destination (address and port number) values between Case II and Case III (and also Case I and Case IV) are reversed. This follows the logic that the destination of the original packet becomes the source for the return packet, and vice versa. Private address and port number values are transparent to the remote server 510 for cases II and III. The destination IP address field in return packets indicates the LAN modem, not a workstation associated therewith.

As soon as the return packet travelling in direction 514 in FIG. 5 is prepared to leave the LAN modem, the routing addresses are changed to the necessary values required to traverse the LAN (Case IV addresses). This requires changes in both the destination IP address and destination port numbers from the public to the private values (see TABLE 1).

After the routing of the original packets travelling in direction 512 in FIG. 5, and the return packets travelling in direction 514 has established a session, the packets continue to be transmitted between workstation 504a and remote server 510.

4. Address Translation When Changing Sessions

New sessions may be created in various software applications. The reason why sessions change varies as a function of the specific software, and does not form a part of the present invention. Changing sessions require that the packet header destination IP address field 604 in FIG. 6 be changed (for packets travelling in the direction indicated by arrow 514 of FIG. 5). Examples of software in which this occurs are CU-SEE (CU-SEEME is a registered trademark of Cornell Research Foundation, Inc. of Ithaca N.Y.), REALAUDIC in UDP mode (REALAUDIO is a trademark of Progressive Networks, Inc. of Seattle, Wash.), QUAKE II (QUAKE II is a trademark of Id. Software, Inc. of Mesquite, Tex.), KALI 95, News Reader using Netscape Communicator (NETSCAPE is a trademark of Netscape Corporation of Mountain View, Calif.), ICQ Chat, XWindows, REALVIDEO, VDO LIVE, NET MEETING (NET MEETING is a trademark of the Microsoft Corporation of Redmond, Wash.), DIABLO, and JEDI KNIGHT (JEDI KNIGHT is a trademark of Twentieth Century-Fox Film Corporation of Los Angeles, Calif).

Maintaining consistent values for private and public source IP address field 602 and public source port number field 610 has been described above (relating the packets travelling in direction 512). Altering these values will destroy the uniqueness of the addresses/port number pair for each workstation located in the LAN. Software that changes sessions in this manner typically does not perform well on networked systems, and may frequently crash.

When a return packet of a new session returns to the LAN modem 300 in FIG. 5, the public destination port number will not match any destination port number entry stored in the NAT table. LAN modem 300 has no definitive information on which workstation 504a or 504b should receive the return packet. This situation has to be dealt with using the techniques illustrated and described in the next two sections.

5. Table Fields

Figure 9:
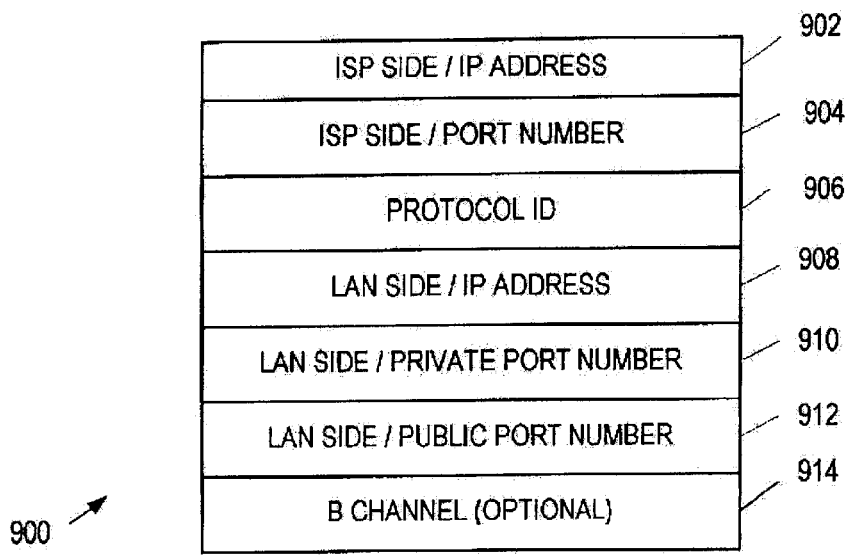
FIG. 9 depicts NAT table fields 900 stored in a single entry stored in the NAT table 435 of one embodiment of the present invention.
Figure 10:
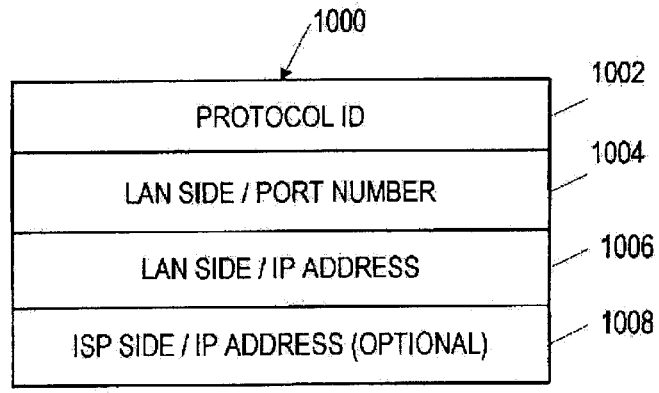
FIG. 10 depicts static table fields 1000 stored in a single entry stored in the static table 514 of one embodiment of the present invention.

FIG. 9 shows NAT table fields 900 that are stored in the NAT table 435 of FIG. 4. FIG. 10 shows the static fields 1000 that are included in the static table 514 of FIG. 5. Note that the field designation used in the fields of FIGS. 9 and 10 differs from the field designation relating to the packet headers illustrated in FIG. 6; FIGS. 9 and 10 fields describe "LAN side" and "ISP (Internet Service Provider) side" fields while FIG. 6 describes "source" and "destination" fields. The "source" field designation (the source IP address field 602 and the source port number field 608) as well as the "destination field designation (the destination IP address field 604 and the destination port number field 610) of FIG. 6 refer to different elements depending upon whether the packets are traveling in the direction indicated by arrow 512 or 514. For example, for packets traveling in the direction indicted by arrow 512 in FIG. 5, the term "destination" in the field indicates the field relates to the remote server 510, while the term "source" in the fields indicates the field relates to the workstation 504a or 504b. For packets traveling in the direction indicted by arrow 514 in FIG. 5, the term "destination" in the fields indicates the field relates to the workstation 504a or 504b, while the term "source" in the fields indicate the field relates to the remote server 510.

The field reference in FIGS. 9 and 10 in the NAT table and the static table, respectively, relates to the perspective of the LAN modem, and does not change based upon which direction a particular packet is traveling. Many fields in FIGS. 9 and 10 contain reference to either an ISP side or a LAN side. The "ISP" term in a field in FIGS. 9 and 10 indicates the field relates to the remote server 510. The "LAN" term in a field in FIGS. 9 and 10 indicates the field relates to the workstation 504a or 504b.

The values stored in all of the combined NAT table fields 900 of FIG. 9 are stored as a record for each packet having packet header info that does not match any entry stored in the NAT table 435. The combined NAT table fields 900 can be used by latter packets in determining where prior packets traveled from, traveled to, what information the packets contained, the port numbers associated with the packets, and other similar information described below. The NAT table fields 900 of FIG. 9 comprise an ISP side/IP address field 902, an ISP side/Port Number field 904, a Protocol ID field 906, a LAN side/IP Address field 908, a LAN side/private port number field 910, and a LAN side/public port number field 912. The contents of each of the NAT table fields are now described.

The ISP side/IP address field 902 of FIG. 9 contains the record for certain prior packets traveling through the LAN modem 300. If a latter packet contains identical packet header field information (as illustrated in FIG. 6) to the information stored in the FIG. 9, the packet header information will not have to be stored in the NAT table 900 format. Otherwise, the packet is assumed to be the first packet relating to a specific session, and it is important to generate a new record containing the information of the combined NAT table fields 900, so latter packets contain the routing information relating to the packet. This technique limits duplicate records being stored in the NAT table of FIG. 9.

The value stored in an ISP side/IP address field 902 of FIG. 9 relates (in prior packets traveling in the direction indicted by arrow 512 whose packet header information 600 in FIG. 6 was stored in the NAT table) to the value stored in the destination IP address field 604 of FIG. 6. The ISP side/IP address field stored values also corresponds (in prior packets traveling in the direction indicted by arrow 514 whose packet header information 600 in FIG. 6 was stored in the NAT table) to the value stored in the source IP address field 602 of FIG. 6. The ISP side/IP address field 902 concerns the IP address of the remote server 510 that either transmits, or receives, the packet.

The value stored in an ISP side/Port Number field 904 of FIG. 9 relates (in prior packets traveling in the direction indicted by arrow 512 whose packet header information 600 in FIG. 6 was stored in the NAT table) to the value stored in the destination port number field 604 of FIG. 6. The ISP side/Port Number field 904 stored value also corresponds (in prior packets traveling in the direction indicted by arrow 514 whose packet header information 600 in FIG. 6 was stored in the NAT table) to the value stored in the source port number field 608 of FIG. 6. The ISP side/Port Number field 904 concerns the port number associated with the specific application, session, and the remote server 510 that either transmits, or receives, the packet.

The value stored in the protocol ID field 906 in FIG. 9 relates to the protocol of the data contained in the packet. The protocol ID field 906 relates to the value stored in the protocol ID field 606 in FIG. 6.

The value stored in a LAN side/IP address field 908 of FIG. 9 relates (in prior packets traveling in the direction indicted by arrow 512 whose packet header information 600 in FIG. 6 was stored in the NAT table) to the value stored in the source IP address field 602 of FIG. 6 when the packet is within the LAN. The LAN side/IP address field stored value also corresponds (in prior packets traveling in the direction indicted by arrow 514 whose packet header information 600 in FIG. 6 was stored in the NAT table) to the value stored in the destination IP address field 604 of FIG. 6 when the packet is within the LAN. The LAN side/IP address field 908 concerns the IP address of the workstation 504*a*, 504*b* that either transmits, or receives, the packet.

The value stored in a LAN side/Private Port Number field 910 of FIG. 9 relates (in prior packets traveling in the direction indicted by arrow 512 whose packet header information 600 in FIG. 6 was stored in the NAT table) to the value stored in the source port number field 608 of FIG. 6 when the packet is within the LAN. The LAN side/Private Port Number field 910 stored value also corresponds (in prior packets traveling in the direction indicted by arrow 514 whose packet header information 600 in FIG. 6 was stored in the NAT table) to the value stored in the destination port number field 610 of FIG. 6 when the packet is in the LAN. The LAN side/Private Port Number field 910 concerns the private port number associated with the specific application, session, and the workstation 504*a* or 504*b* that either transmits, or receives, the packet when the packet is traversing the LAN.

The value stored in a LAN side/Public Port Number field 912 of FIG. 9 relates (in prior packets traveling in the direction indicted by arrow 512 whose packet header information 600 in FIG. 6 was stored in the NAT table) to the value stored in the source port number field 608 of FIG. 6 when the packet is traversing the Internet. The LAN side/Public Port Number field 912 stored value also corresponds (in prior packets traveling in the direction indicted by arrow 514 whose packet header information 600 in FIG. 6 was stored in the NAT table) to the value stored in the destination port number field 610 of FIG. 6 when the packet is traversing the Internet. The LAN side/Public Port Number field 912 concerns the public port number associated with the specific application, session, and the workstation 504*a* or 504*b* that either transmits, or receives, the packet when the packet is traversing the Internet.

The value stored in a B Channel field 914 of FIG. 9 relates to which B channel ($B_1$ or $B_2$) a packet was on when travelling between the remote network and the LAN modem. This field is optional, and is used in a hierarchical procedure described below in ensuring further correspondence between the NAT table entry and how the packet should be routed.

The values stored in each of the combined static fields 1000 are manually input by a computer operator. Each entry containing the static able fields 1000 (in a similar manner as the NAT table fields) acts as a record for packets as the packets travel across the LAN modem 300 between the workstations 504*a* or 504*b* and each remote server 510, as described below. Each entry containing the static table fields 1000 of FIG. 10 comprise a protocol ID field 1002, a LAN side/Port Number field 1004, a LAN side/IP Address field 1006, and an ISP side/IP Address field 1008 (which is necessary if there are more than one workstations using the application associated with the static table entry on the LAN). The contents of the static table fields 100 are now described.

The value stored in the protocol ID field 1002 in FIG. 10 relates to the protocol of the data contained in the packet. The protocol ID field 1002 concerns the value stored in the packets in the protocol ID field 606 (FIG. 6).

The value stored in a LAN side/Port Number field 1004 of FIG. 10 relates to the value stored in the source port number field 608 of FIG. 6 in packets traveling in the direction indicted by arrow 512. The LAN side/Port Number field 1004 stored value also corresponds to the value stored in the destination port number field 610 of FIG. 6 in packets traveling in the direction indicted by arrow 514. The LAN side/Port Number field 1004 concerns the port number associated with the specific application, session, and the workstation 504*a* or 504*b* that either transmits, or receives, the packet when the packet is traversing the LAN.

The value stored in a LAN side/IP address field 1006 of FIG. 10 relates to the value stored in the source IP address field 602 of FIG. 6 for packets traveling in the direction indicted by arrow 512 using the private address of the LAN. The LAN side/IP address field stored value also corresponds to the value stored in the destination IP address field 604 of FIG. 6 for packets traveling in the direction indicted by arrow 514. The LAN side/IP address field 1006 concerns the private IP address of the workstation 504*a*, 504*b* that either transmits, or receives, the packet.

The value stored in an ISP side/IP address field 1006 of FIG. 10 relates to the value stored in the destination IP address field 604 of FIG. 6 in packets traveling in the direction indicted by arrow 512. The ISP side/IP address field stored values also corresponds to the value stored in the source IP address field 602 of FIG. 6 in packets traveling in the direction indicted by arrow 514. The ISP side/IP address field 1006 concerns the IP address of the remote server 510 that either transmits, or receives, the packet. If only one user in a LAN is likely to use a specific software, then this field is optional since the combination of the fields 1002, 1004, and 1006 is sufficient to direct a packet traversing the LAN modem 300 to the correct workstation in the LAN; since the LAN modem is programmed to realize that only one workstation in the LAN is utilizing a specific application associated with the packet, then the LAN modem knows which workstation to transmit the packet. The field 1008 is necessary for static table entries where more than one workstation in the LAN are using the same application to remove any ambiguity about which workstation to route the packet to.

6. Hierarchical Procedure

Figure 8:
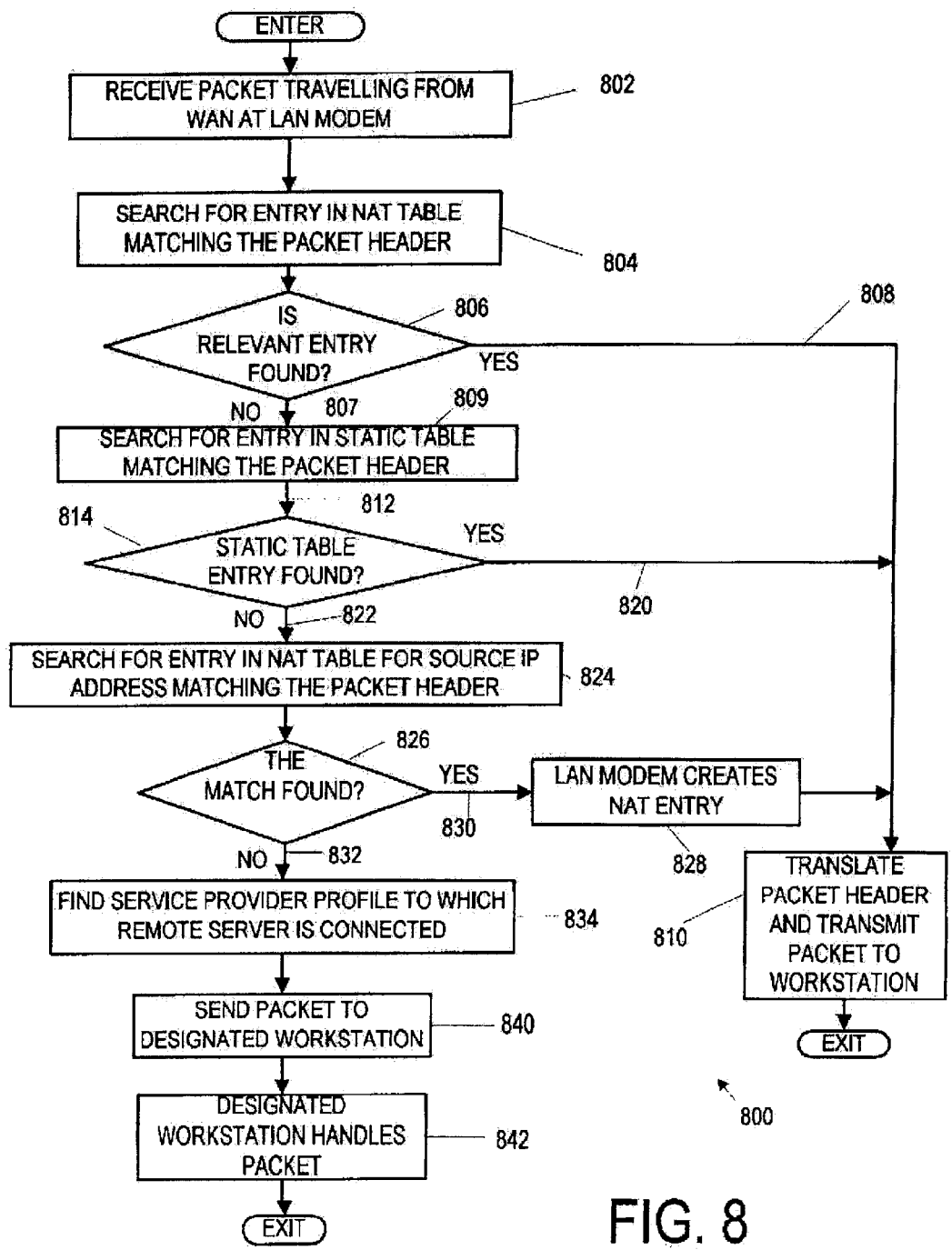
FIG. 8 depicts a block diagram of our invention software that provides a hierarchical procedure that determines a particular workstation, contained within LAN 502, to where a packet is to be routed, the software being executed by the central processing unit (CPU) 330 situated in the LAN modem.

The hierarchical procedure 800, shown in FIG. 8, determines which workstation to route a return packet that has returned from the remote server 510 as shown in FIG. 5 (and as such, can be considered as returning from the remote network 60, typically a WAN). The code of the hierarchical procedure is generally stored in DRAM 372 of FIG. 3, and is a portion of the IP address/port number translation process 435 illustrated in FIG. 4B as described above.

In hierarchical procedure 800, block 802 receives the packet travelling from remote server 510 to workstation 504a at LAN modem 300. The first of the four steps performed by the LAN modem in the hierarchical procedure determines whether the packet can be definitively routed to the correct workstation using the information stored in the packet header compared to information stored in an entry of the NAT table. The first step includes blocks 802 and 804, as well as decision block 806.

Block 804 searches for matches in which all of the values of any entry of the NAT table fields 900 shown in FIG. 9 match any corresponding values stored in the packet header fields shown in FIG. 6. More specifically:

a) the value stored in the source IP address field 602 is compared to the value stored in the ISP side/IP address field 902 of any entry stored in the NAT table;

b) the value stored in the protocol ID field 606 is compared to the value stored in the protocol ID field 906 of any entry stored in the NAT table;

c) the value stored in the source port number field 608 is compared with the value stored in the ISP side/port number field 904 of any entry stored in the NAT table; and d) the value stored in the destination port number field 610 is compared with the value stored in LAN side/public port number field 912 of any entry stored in the NAT table.

The hierarchical procedure 800 continues to decision block 806. If each of these four comparisons outlined in a) to d) are found to match, then the LAN modem has found an entry containing relevant routing info for this packet. If the answer to decision block 806 is yes, then path 808 is followed to block 810. In block 810, the LAN side/private port number field 910 of the NAT table entry is substituted into the destination port number field 610 of FIG. 6 of the packet header. In addition, the value stored in the LAN side/IP address field in FIG. 9 is substituted for the value stored in the destination IP address field 604 of FIG. 6. With this substituted packet header, the packet is routed to the correct workstation 504a or 504b of FIG. 5.

If the decision block 806 cannot find a relevant entry in which each of the four fields in the packet header match the four fields of any NAT table entry stored in the NAT table, then the decision block 806 follows path 807 to a second step of the hierarchical process. The second step of the hierarchical process includes block 809 and decision block 814. While the LAN modem automatically inputs entries into the NAT table, all static table entries are input by computer operators. By default, the static table has no entries. The fields contained in each static table entry are displayed in FIG. 10 as described above.

In block 809, the values stored in the fields of the packet header illustrated in FIG. 10 are compared for matches with the values stored in the corresponding fields for any static table entry of FIG. 10. More specifically:

a) the value stored in the protocol ID field 606 is compared to the value stored in the protocol ID field 1002 of each entry stored in the static table; and b) the value stored in the destination port number field 610 is compared with the value stored in the LAN side/port number field 1004 stored in the static table.

The hierarchical procedure 800 continues to decision block 814. If both the comparisons a) and b) match for any single entry in the static table, then path 830 is followed to block 810. This indicates a sufficient correspondence between the static table entry and the packet header information to be assured that the LAN side/IP address 1006 of the static table entry is the IP address that the packet should be directed. If the answer to the decision block 814 is no, then path 822 is followed to the third step of the hierarchical procedure.

A third step of hierarchical procedure 800 comprises block 824, decision block 826, and block 828. This third step has been found to substantially improve performance in the software in which the sessions may change, as described above. This step considers only the source IP address field 602 of the return packet and searches NAT table 435 entries for matches. This step seeks prior sessions in which packets were transmitted between the same remote server 510 and any workstation in the LAN. If so, since there are so many remote servers on the Internet, the latter sessions involving the same remote server probably involve the same workstation as well. This third step involves probabilities, and presumes an extremely large number of remote servers located on the remote network such as the Internet. Under these circumstances, there are very few instances where two workstations in the same LAN will be communicating with the same remote server within the same time period.

In block 824, the LAN modem 300 searches the value contained in source IP address field 602 of FIG. 6 for any NAT table entry having the same value stored in the ISP side/IP address field 902 of FIG. 9. If a matching NAT table entry is found, then information stored in it is sufficient to route the packet to the correct workstation. The change of destination port number stored in the packet header probably resulted from a change in sessions. The probability of a new session being created and causing the change in port numbers is much higher that the probability that two different workstations in the same LAN happen to be communicating with the same remote server 510. If, however, source IP address field 602 of the packet header of FIG. 6 does not match any NAT table entry, then the hierarchical process continues to step 4 described below.

An optional additional matching criteria for block 824 is to consider whether the B channel field 914 in the NAT table entry matches the B channel that the packet arrived on from the remote network to the LAN modem. If the present packet does not match the value stored in the B channel field, then the packet should not be routed to the workstation described by the LAN side/IP address. A match between present packet and the value stored in the B channel field further indicates that the Workstation indicated in the NAT table entry is the correct one to route the packet to.

After block 824 is executed, hierarchical Procedure 800 continues to decision block 826. If packet header and NAT table match, oath 830 is followed to block 828. Otherwise, decision block 826 follows path 832 to block 834 included in the third step of the hierarchical process. When block 828 is executed, the LAN modem creates a new table entry in the NAT table corresponding to the values contained in the received packet. In the new NAT table entry: a) the source IP address field value 602 of FIG. 6 is stored as the ISP side/IP address field value 902 of FIG. 9 of the new NAT table entry; b) the existing LAN side/IP address 908 of the matching NAT table entry is stored in the new LAN side/IP address field of the new NAT table entry; c) the protocol ID field value 606 is stored as the protocol ID field 906 value of the new NAT table entry; d) the source port number field value 608 is stored in the ISP side/port number field value 904 of the new NAT table entry; e) the destination port number field value 610 is input as the LAN side/public port number 912 of the new NAT table entry; and f) the destination port number field value 610 is also input as the LAN side/private port number field 910 of the new NAT table entry. After block 828, the procedure transmits packet to the appropriate workstation 804*a* or 804*b* in block 810 using the packet header values corresponding to the new NAT table entries.

The fourth step of the hierarchical process is the last step in hierarchical procedure 800, and comprises block 834, block 840, and block 842. The fourth step transfers all of the remaining packets to a designated workstation. The workstation selected as the designated workstation on LAN should: (a) be the busiest workstation in the LAN; (b) have the greatest number of applications; or (c) be selected by some other criterion. The designated workstation is selected as the workstation that is most likely able to use the packet.

Block 834 locates the service provider profile relating to the remote server 510 (the service provider profile is contained in the database 416. The LAN modem then determines the designated workstation from the service provider profile. After block 834, the procedure continues to block 840. In block 840, the packet is sent to the designated workstation. In block 842, the designated workstation receives and utilizes the packet. The detailed embodiment of the present invention required some user input for steps two and four of the hierarchical procedure. However, when the packets are being routed to the workstations in the LAN modem, the procedure, at that time, is transparent to the end user.

Although a single, though rather detailed, embodiment which incorporates the teachings of the present invention has been shown and described in detail herein, those skilled in the art can readily devise many other embodiments that still utilize these teachings.

What is claimed is:

1. Apparatus for a router comprising:
a processor;
a memory, connected to the processor for storing executable instructions; and
communication circuitry, operative in response to the processor, for interconnecting first and second networks together so as to receive and transmit packets on said first and second networks;
wherein the processor, in response to execution of the stored instructions, performs the following operations:
(A) searches for an entry in a network address (NAT) table matching a header portion of a received packet and, if found, routes the received packet to an appropriate destination;
(B) searches, if the operation (A) above is unsuccessful, for an entry in a static table matching the header portion of the received packet, and, if found, routes the received packet to the appropriate destination;
(C) searches, if the operations (A) and (B) above steps are unsuccessful, for an entry in the NAT table having an identifier matching the header portion, and, if found, creates a NAT table entry and routing the received packet to the appropriate destination; and
(D) identifies, if the operations (A), (B) and (C) steps are unsuccessful, a profile to which a remote server that provided the received packet belongs, and, routes the received packet to the appropriate destination.

2. The apparatus according to claim 1 wherein the appropriate destination used in said operation (D) is a designated destination.

3. The apparatus according to claim 1 wherein the processor, in response to execution of the instructions and as part of said operation (A), performs the following operations:
compares a value stored in a source address field of the header portion of the received packet with a value stored in an ISP/IP address field of an entry stored in the NAT table;
compares a value stored in a protocol ID field of the header portion of the received packet with a value stored in a protocol ID field of the entry stored in the NAT table;
compares a valued stored in a source port number field of the header portion of the received packet with a value stored in an ISP side/port number field of the entry stored in the NAT table; and
compares a value stored in a destination port number field of the header portion of the received packet with a value stored in a LAN side/public port number field of the entry stored in the NAT table.

4. The apparatus according to claim 3 wherein the processor, in response to execution of the instructions and as part of said operation (B), performs the following operations:
compares a value stored in a protocol ID field of the header portion of the received packet with a value stored in a protocol ID field of each entry contained in the static table; and
compares a value stored in a destination port number field of the header portion of the received packet with a value stored in a LAN side/port number field stored in the static table.

5. The apparatus according to claim 4 wherein the processor, in response to execution of the instructions and as part of said operation (C), performs the following operation:
compares a value stored in a source IP address field of the header portion of the received packet with a value stored in an ISP side/IP address field of a NAT table entry.

6. The apparatus according to claim 4 wherein the processor, in response to execution of the instructions and as part of said operation (C), performs the following operation:
compares a value stored in a B channel field of a NAT table entry with a B channel on which the received packet arrived.

7. The apparatus according to claim 5 wherein the processor, in response to the instructions and as part of said operation (D), performs the following operations:
locates, in a local database, a service provider profile relating to the remote server that provided the received packet; and
identifies the appropriate destination to which to route the received packet from the service provider profile.

8. The apparatus according to claim 7 wherein the appropriate destination is a busiest destination.

9. The apparatus according to claim 7 wherein the appropriate destination is a destination having a greatest number of applications.

* * * * *